(12) United States Patent
Kondo

(10) Patent No.: US 9,672,650 B2
(45) Date of Patent: Jun. 6, 2017

(54) IMAGE PROCESSING APPARATUS, IMAGE PROCESSING METHOD, AND STORAGE MEDIUM

(71) Applicant: I-CUBED RESEARCH CENTER INC., Tokyo (JP)

(72) Inventor: Tetsujiro Kondo, Tokyo (JP)

(73) Assignee: I-CUBED RESEARCH CENTER INC., Tokyo (JP)

( * ) Notice: Subject to any disclaimer, the term of this patent is extended or adjusted under 35 U.S.C. 154(b) by 29 days.

(21) Appl. No.: 14/766,118

(22) PCT Filed: Feb. 10, 2014

(86) PCT No.: PCT/JP2014/053021
§ 371 (c)(1),
(2) Date: Oct. 7, 2015

(87) PCT Pub. No.: WO2014/126032
PCT Pub. Date: Aug. 21, 2014

(65) Prior Publication Data
US 2016/0019705 A1    Jan. 21, 2016

(30) Foreign Application Priority Data
Feb. 12, 2013   (JP) .................................. 2013-024993

(51) Int. Cl.
*G06T 11/60* (2006.01)
*G09G 5/36* (2006.01)
(Continued)

(52) U.S. Cl.
CPC ............ *G06T 11/60* (2013.01); *G06F 3/1446* (2013.01); *G06T 3/4038* (2013.01); *G09G 3/002* (2013.01);
(Continued)

(58) Field of Classification Search
CPC .................. G06F 3/1446; G09G 3/002; G09G 2300/026; G09G 2320/0233;
(Continued)

(56) References Cited

U.S. PATENT DOCUMENTS

| 6,868,190 B1 * | 3/2005 | Morton ..................... G06T 5/00 348/208.13 |
| 2005/0157346 A1 * | 7/2005 | Kitagawara .......... H04N 1/6005 358/2.1 |

(Continued)

FOREIGN PATENT DOCUMENTS

| JP | 2825482 B2 | 11/1998 |
| JP | 3072306 B2 | 7/2000 |

(Continued)

OTHER PUBLICATIONS

Supplementary Partial European Search Report dated Jul. 13, 2016 issued in European Patent Application No. 14752082.9.

(Continued)

*Primary Examiner* — Yon Couso
(74) *Attorney, Agent, or Firm* — McDermott Will & Emery LLP

(57) ABSTRACT

An image processing apparatus includes: a digital processing unit that performs digital processing on accepted one or at least two images, thereby acquiring one or at least two processed images; a physical property information acquiring unit that acquires physical property information, which is information relating to a physical property that has been lost compared with one or more physical properties of a target contained in the images, in the one or at least two processed images; a physical property processing unit that performs physical property processing, which is processing for adding a physical property corresponding to the physical property information, using the one or at least two processed images; and an output unit that outputs a processed image subjected (Continued)

to the physical property processing. Accordingly, it is possible to reproduce lost physical properties of a target expressed in an image, to the fullest extent possible.

28 Claims, 18 Drawing Sheets

(51) Int. Cl.
    *G06F 3/14*     (2006.01)
    *G09G 3/00*     (2006.01)
    *G06T 3/40*     (2006.01)
    *G06K 9/20*     (2006.01)

(52) U.S. Cl.
    CPC ....... *G09G 5/36* (2013.01); *G06K 2009/2045* (2013.01); *G06T 2207/20221* (2013.01); *G09G 2300/026* (2013.01); *G09G 2320/0233* (2013.01); *G09G 2320/0261* (2013.01); *G09G 2320/0266* (2013.01); *G09G 2320/0276* (2013.01); *G09G 2340/0407* (2013.01)

(58) Field of Classification Search
    CPC ... G09G 2320/0261; G09G 2320/0276; G09G 2320/0266; G09G 5/36; G09G 2340/0407; G06K 2009/2045; G06T 3/4038; G06T 2207/20221; G06T 11/60
    See application file for complete search history.

(56) References Cited

U.S. PATENT DOCUMENTS

2006/0120618 A1* 6/2006 Mizoguchi ............ G06T 7/0002
    382/255

2011/0262039 A1   10/2011 Du
2014/0340415 A1* 11/2014 Morifuji ................. G06T 11/60
    345/582

FOREIGN PATENT DOCUMENTS

JP     2011-233148 A   11/2011
JP     2012-253739 A   12/2012

OTHER PUBLICATIONS

Notification of Reasons for Refusal issued Jul. 26, 2016 in corresponding Japanese Patent Application No. 2013-024993, with English language translation.
Sung Ju Hwang et al., "Context-Based Automatic Local Image Enhancement", ECCV 2012, Part I, LNCS 7572, pp. 569-582 (2012).
Kazuya Orihara, "<IFA> "To reproduce the natural world of light" approach to the details of the "ICC-4K TV"—eye cube de Institute Kondo Director Interview", [online], Sep. 2, 2012 [Search on Jul. 19, 2016], Internet, URL, <http://www.phileweb.com/news/d-av/201209/02/31480.html> with English translation.
Kosei Wada, 2013 "Nen wa 4K Terebi ga Kakusha kara Tojo Toshiba, Sharp mo Shinseihin Tonyu o Announce", AV Review, vol. 29, No. 11, Ongen Publishing Co., Ltd., Nov. 25, 2012, pp. 20, 21.
International Search Report and Written Opinion issued in corresponding International Patent Application No. PCT/JP2014/053021 on Mar. 18, 2014. 7 pages with English translation.
Supplementary European Search Report issued in corresponding European Patent Application No. EP 14 75 2082 on Oct. 15, 2016.
Office Action dated Jan. 18, 2017, issued in corresponding Taiwanese Patent Application No. 102148479, with English language translation.

* cited by examiner

IMAGE PROCESSING APPARATUS, IMAGE PROCESSING METHOD, AND STORAGE MEDIUM

RELATED APPLICATIONS

This application is the U.S. National Phase under 35 U.S.C. §371 of International Patent Application No. PCT/JP2014/053021, filed on Feb. 10, 2014, which in turn claims the benefit of Japanese Application No. 2013-024993, filed on Feb. 13, 2013, the disclosures of which Applications are incorporated by reference herein.

TECHNICAL FIELD

The present invention relates to an image processing apparatus and the like for performing processing on an accepted image, thereby obtaining an appropriate output image.

BACKGROUND ART

Conventionally, there has been a digital image signal interpolation apparatus for interpolating pixel data of pixels forming an image (see Patent Document 1).

Furthermore, there has been a digital video signal converting apparatus that generates, from a first digital video signal, a second digital video signal having a larger number of pixels than the first digital video signal (see Patent Document 2).

CITATION LIST

Patent Document

[Patent Document 1] Japanese Patent No. 2825482 (p. 1, FIG. 1, etc.)
[Patent Document 2] Japanese Patent No. 3072306 (p. 1, FIG. 1, etc.)

SUMMARY OF INVENTION

Technical Problem

However, conventional techniques are problematic in that, for example, in the case of capturing an image of a physical target and performing image conversion or digital processing on the image, physical properties such as size or grandeur of the target are lost, and, thus, a user viewing the image does not see the physical properties of the target in the image.

Solution to Problem

A first aspect of the present invention is directed to an image processing apparatus, including: an image accepting unit that accepts one or at least two images; a digital processing unit that performs digital processing on the one or at least two images accepted by the image accepting unit, thereby acquiring one or at least two processed images; a physical property information acquiring unit that acquires physical property information, which is information relating to a physical property that has been lost compared with one or more physical properties of a target contained in the one or at least two images accepted by the image accepting unit; a physical property processing unit that performs physical property processing, which is processing for adding a physical property corresponding to the physical property information, using the one or at least two processed images; and an output unit that outputs a processed image subjected to the physical property processing.

With this configuration, it is possible to reproduce lost physical properties of a target contained in an image, to the fullest extent possible.

Furthermore, a second aspect of the present invention is directed to the image processing apparatus according to the first aspect, wherein the digital processing unit performs digital processing on the one or at least two images accepted by the image accepting unit, using after-processing information, which is information obtained after the physical property processing unit performs the physical property processing, thereby acquiring one or at least two processed images.

With this configuration, it is possible to perform digital processing reflecting the physical property processing, thereby making it possible to more precisely reproduce lost physical properties of a target contained in an image.

Furthermore, a third aspect of the present invention is directed to the image processing apparatus according to the first aspect, wherein the digital processing unit performs digital processing on the one or at least two images accepted by the image accepting unit, using the physical property information, thereby acquiring one or at least two processed images.

With this configuration, it is possible to perform digital processing reflecting the physical property information, thereby making it possible to more precisely reproduce lost physical properties of a target contained in an image.

Furthermore, a fourth aspect of the present invention is directed to the image processing apparatus according to any one of the first to third aspects, wherein the physical property information acquiring unit acquires physical property information, using the one or at least two images accepted by the image accepting unit or the one or at least two processed images.

With this configuration, it is possible to reproduce lost physical properties of a target contained in an image, to the fullest extent possible.

Furthermore, a fifth aspect of the present invention is directed to the image processing apparatus according to any one of the first to fourth aspects, further including: a storage unit in which a look-up table having one or at least two pieces of association information, which is information for associating the whole or part of one or at least two images with the whole or part of processed images that are images of the same target as the images, and is information including information for acquiring physical property information, can be stored; wherein the digital processing unit acquires the whole or part of one or at least two processed images associated with the whole or part of the one or more images accepted by the image accepting unit, using one piece of association information of the one or at least two pieces of association information, and the physical property information acquiring unit acquires physical property information, using one piece of association information of the one or at least two pieces of association information.

With this configuration, it is possible to reproduce lost physical properties of a target contained in an image, to the fullest extent possible.

Furthermore, a sixth aspect of the present invention is directed to the image processing apparatus according to the first or fourth aspect, further including: a storage unit in which two or more look-up tables each having one or at least two pieces of association information, which is information for associating the whole or part of one or at least two images with the whole or part of processed images that are images of the same target as the images, and is information including information for acquiring physical property information, can be stored; wherein the digital processing unit acquires the whole or part of one or at least two processed images associated with the whole or part of the one or more images accepted by the image accepting unit, using one piece of association information of the pieces of association information in one look-up table of the two or more look-up tables, and the physical property information acquiring unit acquires physical property information, using one piece of association information of the pieces of association information in one look-up table of the two or more look-up tables.

With this configuration, it is possible to reproduce lost physical properties of a target contained in an image, to the fullest extent possible.

Furthermore, a seventh aspect of the present invention is directed to the image processing apparatus according to the fifth or sixth aspect, further including: an image analysis unit that analyzes the whole or part of the one or more images accepted by the image accepting unit, thereby acquiring an analysis result, and selects association information corresponding to the analysis result; wherein the digital processing unit acquires the whole or part of one or at least two processed images associated with the whole or part of the one or more images accepted by the image accepting unit, using the association information selected by the image analysis unit, and the physical property information acquiring unit acquires physical property information, using the association information selected by the image analysis unit.

With this configuration, it is possible to reproduce lost physical properties of a target contained in an image, to the fullest extent possible.

Furthermore, an eighth aspect of the present invention is directed to the image processing apparatus according to any one of the first to third aspects, wherein the image accepting unit also accepts physical property information associated with the one or at least two images, and the physical property information acquiring unit acquires physical property information associated with the one or at least two images.

With this configuration, it is possible to reproduce lost physical properties of a target contained in an image, to the fullest extent possible, the physical properties of the target being available on site of image capture or the like.

Furthermore, a ninth aspect of the present invention is directed to the image processing apparatus according to any one of the first to third aspects, further including: a physical property information accepting unit that accepts physical property information; wherein the physical property information acquiring unit acquires physical property information accepted by the physical property information accepting unit.

With this configuration, it is possible to reproduce lost physical properties of a target contained in an image, to the fullest extent possible, the physical properties being input by a user.

Furthermore, a tenth aspect of the present invention is directed to the image processing apparatus according to any one of the first to ninth aspects, wherein, in a case where the one or at least two processed images are to be optically output, the physical property processing unit performs control for optical output, according to the physical property information, and the output unit outputs one or at least two processed images subjected to the control for optical output of the one or at least two processed images, based on the control for optical output performed by the physical property processing unit.

With this configuration, it is possible to perform control of optical output, in order to reproduce lost physical properties of a target contained in an image, to the fullest extent possible.

Furthermore, an eleventh aspect of the present invention is directed to the image processing apparatus according to the tenth aspect, wherein the physical property information is information relating to a light intensity, the physical property processing unit sets a light intensity in a case where optical output is to be performed, according to the physical property information, and the output unit outputs the one or at least two processed images, according to the set light intensity.

With this configuration, it is possible to perform control of a light intensity, in order to reproduce lost physical properties of a target contained in an image, to the fullest extent possible.

Furthermore, a twelfth aspect of the present invention is directed to the image processing apparatus according to the tenth aspect, wherein the physical property information is information relating to a field-of-view angle, the physical property processing unit sets a field-of-view angle, according to the physical property information, and the output unit outputs the one or at least two processed images, according to the set field-of-view angle.

With this configuration, it is possible to perform control of a field-of-view angle at the time of optical output, in order to reproduce lost physical properties of a target contained in an image, to the fullest extent possible.

Furthermore, a thirteenth aspect of the present invention is directed to the image processing apparatus according to any one of the ninth to twelfth aspects, wherein the image processing apparatus includes multiple output units, the physical property information acquiring unit acquires physical property information, which is information for controlling optical output of the multiple output units, and the physical property processing unit performs control for optical output of the multiple output units, according to the physical property information.

With this configuration, it is possible to perform control of optical output of multiple output units, in order to reproduce lost physical properties of a target contained in an image, to the fullest extent possible.

Furthermore, a fourteenth aspect of the present invention is directed to the image processing apparatus according to any one of the second to thirteenth aspects, further including: an output image information acquiring unit that acquires output image information, which is information relating to the one or at least two processed images output by the output unit; wherein the after-processing information is the output image information.

With this configuration, it is possible to more precisely reproduce lost physical properties of a target contained in an image, with feedback control using information obtained from an output image.

Furthermore, a fifteenth aspect of the present invention is directed to the image processing apparatus according to any one of the second and fourth to thirteenth aspects, further including: a user reaction information acquiring unit that acquires user reaction information, which is information relating to a reaction of a user viewing a processed image, wherein the after-processing information is the user reaction information.

With this configuration, it is more precisely reproduce lost physical properties of a target expressed in an image, with feedback control using a reaction of a user viewing an output image.

Furthermore, a sixteenth aspect of the present invention is directed to the image processing apparatus according to any one of the second and fourth to fifteenth aspects, wherein the after-processing information is information relating to a display screen area, and the digital processing unit performs processing that causes a spatiotemporal luminance activity to be adjusted according to the display screen area, on the one or at least two images accepted by the image accepting unit.

Furthermore, a seventeenth aspect of the present invention is directed to the image processing apparatus according to any one of the first to sixteenth aspects, wherein the digital processing unit includes: a restrictive condition storage part in which one or more restrictive conditions regarding a pixel and a region contained in an image can be stored; and a digital processing part that changes a pixel and a region contained in the one or at least two images accepted by the image accepting unit such that the one or more restrictive conditions are satisfied by the one or at least two images, thereby acquiring one or at least two processed images.

Furthermore, an eighteenth aspect of the present invention is directed to the image processing apparatus according to any one of the first to seventeenth aspects, wherein the physical property processing unit includes: a physical property restrictive condition storage part in which one or more restrictive conditions regarding the physical property information can be stored; and a physical property processing part that changes the physical property information such that the one or more restrictive conditions are satisfied by one or at least two images that are to be output by the output unit, thereby acquiring one or at least two processed images.

Furthermore, a nineteenth aspect of the present invention is directed to the image processing apparatus according to the seventeenth or eighteenth aspect, wherein the restrictive condition is a condition regarding a luminance value of a pixel and a region contained in an image, and the digital processing part changes a luminance value of a pixel and a region contained in the one or at least two images accepted by the image accepting unit such that the one or more restrictive conditions are satisfied, thereby acquiring one or at least two processed images.

Furthermore, a twentieth aspect of the present invention is directed to the image processing apparatus according to the seventeenth or eighteenth aspect, wherein the restrictive condition is a condition regarding a relationship between two or more pixels and between two or more regions contained in an image, the digital processing unit further includes a field-of-view area information storage part in which field-of-view area information, which is information relating to a field-of-view area, can be stored, the digital processing part changes a luminance value of a pixel and a region contained in the one or at least two images accepted by the image accepting unit such that the one or more restrictive conditions are satisfied in an area in the one or at least two images, the area being a field-of-view area indicated by the field-of-view area information, thereby acquiring one or at least two processed images.

Furthermore, a twenty-first aspect of the present invention is directed to the image processing apparatus according to any one of the first to twentieth aspects, wherein the output unit includes: an output restrictive condition storage part in which one or more restrictive conditions regarding output can be stored; and an output part that changes the one or at least two processed images such that the one or more restrictive conditions are satisfied by one or at least two images that are to be output, and outputs the changed one or at least two processed images.

Furthermore, a twenty-second aspect of the present invention is directed to the image processing apparatus according to any one of the first to twenty-first aspects, wherein the physical property information acquiring unit acquires information relating to a display screen area corresponding to a size of a target contained in the one or at least two images accepted by the image accepting unit, the physical property processing unit sets the information relating to the display screen area, and the output unit outputs the one or at least two processed images, according to the information relating to the display screen area.

Furthermore, a twenty-third aspect of the present invention is directed to the image processing apparatus according to any one of the first to twenty-first aspects, wherein the image processing apparatus includes multiple output units having different resolutions, the physical property information acquiring unit acquires, for each of the multiple output units, portion specifying information for specifying a partial image, which is an image of a portion forming the processed image, and is an image output by that output unit, and each of the multiple output units outputs a partial image specified with the corresponding portion specifying information.

Furthermore, a twenty-fourth aspect of the present invention is directed to the image processing apparatus according to any one of the first to twenty-first aspects, wherein the image processing apparatus includes multiple output units, the image accepting unit accepts two or more types of images obtained by capturing images of one target in different environments, the digital processing unit performs digital processing on the two or more types of images, thereby acquiring two or more types of processed images, the physical property information acquiring unit acquires physical property information, which is information for specifying the whole or part of the two or more types of processed images, and the physical property processing unit instructs the multiple output units to output the whole or part of two or more processed images in an overlapping manner, according to the physical property information.

Advantageous Effects of Invention

The image processing apparatus according to the present invention can reproduce lost physical properties of a target contained in an image, to the fullest extent possible.

DESCRIPTION OF EMBODIMENTS

Figure 1:
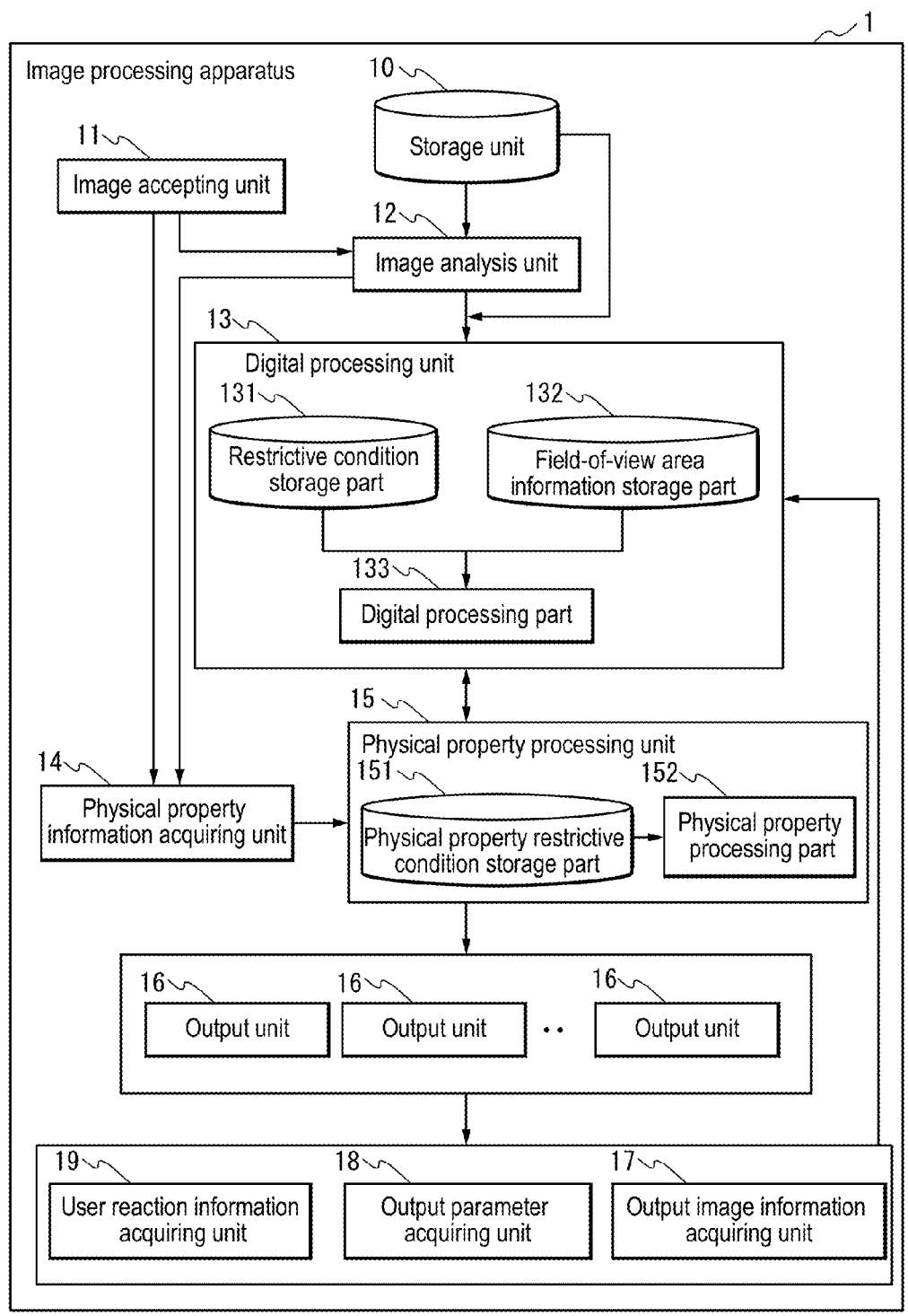
FIG. 1 is a block diagram of an image processing apparatus 1 in Embodiment 1.

Hereinafter, embodiments of an image processing apparatus and the like will be described with reference to the drawings. Note that constituent elements denoted by the same reference numerals perform similar operations in the embodiments, and, thus, a description thereof may not be repeated.

Embodiment 1

This embodiment will describe an image processing apparatus that, after performing digital processing on an accepted image, acquires physical property information, which is information relating to lost physical characteristics of a target in the image, and performs physical property processing for reproducing physical properties corresponding to the physical property information, thereby obtaining an output image. The physical characteristics, which are also referred to as physical properties, are physical characteristics that a target in an image (or the whole of an image) originally has, and examples thereof include size, movement, brightness, color, and the like of the target and the like in the image.

Furthermore, this embodiment will describe an image processing apparatus that performs digital processing, using information obtained after physical property processing.

Furthermore, this embodiment will describe an image processing apparatus that acquires physical property information, using an input image, an image that is being processed, or an output image.

Furthermore, this embodiment will describe an image processing apparatus that performs digital processing and physical property processing, using a look-up table (hereinafter, referred to as an "LUT" as appropriate).

Furthermore, this embodiment will describe an image processing apparatus that selects an appropriate LUT from among multiple LUTs, and performs digital processing and physical property processing, using the selected LUT.

Furthermore, this embodiment will describe processing that, for example, changes a spatiotemporal luminance activity, modifies a spatiotemporal luminance using a restrictive condition, or maintains relationships between pixels and between regions using a restrictive condition, as a specific example of digital processing.

Furthermore, this embodiment will describe an image processing apparatus that performs control of optical output, as an example of physical property processing.

Furthermore, this embodiment will describe, for example, processing that makes a size of an image closer to a size at a field-of-view angle, processing that makes a spatial resolution non-uniform as appropriate, processing that outputs two or more images obtained by capturing images of the same target in an overlapping manner, and the like, as a specific example of physical property processing.

Note that, in this embodiment, an image may be a moving image, or may be a still image. If an image is a moving image, the image has two or more fields. One field is one screen, and may be referred to as one frame.

FIG. 1 is a block diagram of an image processing apparatus 1 in this embodiment. The image processing apparatus 1 includes a storage unit 10, an image accepting unit 11, an image analysis unit 12, a digital processing unit 13, a physical property information acquiring unit 14, a physical property processing unit 15, one or at least two output units 16, an output image information acquiring unit 17, an output parameter acquiring unit 18, and a user information acquiring unit 19.

The digital processing unit 13 includes, for example, a restrictive condition storage part 131, a field-of-view area information storage part 132, and a digital processing part 133.

The physical property processing unit 15 includes, for example, a physical property restrictive condition storage part 151 and a physical property processing part 152.

Each of the output units 16 includes, for example, an output restrictive condition storage part 161 and an output part 162.

It is preferable that the output units 16 of the image processing apparatus 1 are, for example, apparatuses that perform optical output, such as projectors or organic EL displays. The output units 16 may be output apparatuses such as liquid crystal displays or cathode ray tubes. That is to say, there is no limitation on the type of display in the image processing apparatus 1.

In the storage unit 10, one or at least two look-up tables (hereinafter, referred to as "LUTs" as appropriate) can be stored. In the storage unit 10, two or more pairs of a type identifier for identifying the type of LUT and an LUT associated with the type identifier may be stored. Note that the data structure of an LUT is not limited to a table structure. That is to say, there is no limitation on the data structure of an LUT. It will be appreciated that the type of LUT may be an LUT itself.

An LUT has one or at least two pieces of association information. The association information is information for associating the whole or part of one or at least two images (images accepted by the image accepting unit 11) with the whole or part of processed images (images output by the digital processing unit 13) that are images of the same target as the images. The association information includes information for acquiring physical property information. The target may be part of objects in an image, or may be scenery, scene, or the like shown in the whole of an image. The objects are, for example, a physical object such as a person, a mountain, a river, a tree swaying in the wind, an automobile, or the like. The physical property information may be information indicating a physical property, but also may be information for reproducing a lost physical property. The physical property information is, for example, light intensity, field-of-view angle, zoom factor, optical output control information of the two or more output units 16, or user reaction information. The optical output control information is information such as light intensity, field-of-view angle, output image area, or the like, at the time of optical output. The user reaction information is, for example, movement of the eyes, state of the pupils, movement of the face, or the like, of a person who is viewing a target. The physical property may be any physical property of a target, such as size, brightness, movement, color, or the like of the target. The information for acquiring physical property information may be physical property information itself, and examples thereof include information indicating a light intensity at the time of output of an image and a field-of-view angle at the time of output of an image, an arithmetic expression for calculating a light intensity, an arithmetic expression for calculating a field-of-view angle, and the like. The physical property information is, for example, information relating to a light intensity at the time of output of an image. The physical property information is, for example, information relating to a field-of-view angle at the time of output of an image.

It will be appreciated that the association information or the LUT may change in accordance with the type of output apparatus. For example, since a projector and an organic EL display have different light-emitting principles, pixel shapes, and the like, an output content of an image for reproducing physical properties may vary.

Furthermore, if the number of pieces of association information contained in an LUT is one, this association information is, for example, an arithmetic expression for converting an image, or one or more groups of parameters that are to be given to an arithmetic expression for converting an image. The association information may be, for example, an arithmetic expression for calculating median pixel values of spatiotemporal blocks.

Furthermore, the association information is, for example, information having first image-related information, second image-related information, and physical property information. The first image-related information is information relating to the whole or part of one or at least two images. The second image-related information is information relating to the whole or part of one or at least two processed images. The first image-related information is, for example, one or more feature amounts extracted from the whole or part of one or more images. The second image-related information is, for example, the whole or part of one or more processed images. The second image-related information is, for example, an arithmetic expression for generating the whole or part of one or more processed images. The second image-related information is, for example, a pair of groups of parameters that are to be given to an arithmetic expression for generating the whole or part of one or more processed images. In this case, the arithmetic expression is held, for example, by the digital processing unit 13. Examples of the one or more feature amounts extracted from an image include a vicinity feature amount, which is a feature amount of part of one or more images, and a whole feature amount, which is a feature amount of the whole of one or more images. Examples of the vicinity feature amount include a pixel value, an activity, a spatiotemporal correlation, a motion vector, and a frequency distribution. Examples of the activity include a maximum value and a minimum value of multiple pixels, a dynamic range (DR), and a difference between multiple pixels. The difference between multiple pixels may be a difference between multiple pixels in a space, may be a difference between multiple pixels in the time direction, or may be a difference between multiple pixels in a space and in the time direction. Examples of the whole feature amount include a pixel value distribution in the whole of an image, a motion vector distribution in the whole of an image, a spatiotemporal correlation of the whole of one or at least two images, a noise amount of the whole of an image, an image format, information relating to edition of the whole of an image (whether or not PinP is selected, whether or not PoutP is selected, whether or not there is text superimposed on the image, etc.), content information relating to a content, which is one or more images, and a pattern detection result (face, etc.). The content information refers to, for example, the genres, the titles, and the names of people starring in programs listed in an electronic program guide (EPG). The one or more feature amounts are also referred to as feature amount vectors as appropriate.

Furthermore, the whole or part of one or more images and the whole or part of one or more processed images described above may be an image of one screen that is to be output, may be an image of blocks in part of one screen, may be one pixel, may be temporally successive multiple screens, may be part (spatiotemporal blocks, which will be described later) of spaces in temporally successive multiple screens, or may be a group of successive images of one pixel on temporally successive multiple screens, for example. That is to say, there is no limitation on units of information amount of images and processed images. The spatiotemporal block typically refers to a portion acquired by spatially, temporally, or spatially and temporally dividing video. It is sufficient that the spatiotemporal block is a pixel group. That is to say, the spatiotemporal block is not limited to rectangular successive regions. The spatiotemporal block also may be a non-rectangular and non-successive image region. Multiple spatiotemporal blocks acquired by dividing an image may partially have overlapping pixels.

The image accepting unit 11 accepts one or at least two images. The image accepting unit 11 may accept two or more types of images obtained by capturing images of one target in different two or more environments. An image herein is typically an image captured with a camera, but does not necessarily have to be a captured image. The image may be, for example, a CG image or the like. The different environments are environments in which times, weathers, temperatures, cameras, camera parameters, or the like are different from each other. The two or more types of images are, for example, a dark image and a light image, images having different resolutions, images having different numbers of colors, images having different field-of-view angles, or the like. The accepting is typically receiving using a communication part or a broadcast receiving part, but is a concept that encompasses accepting information read from a storage medium such as an optical disk, a magnetic disk, or a semiconductor memory, and accepting an image input from an input device such as a scanner or a camera. The image accepting unit 11 may be realized by, for example, a broadcast receiving part, a communication part, or the like.

The image analysis unit 12 analyzes the whole or part of the one or more images accepted by the image accepting unit 11, thereby acquiring an analysis result, and selects association information corresponding to the analysis result. The image analysis unit 12 may analyze the whole or part of the one or more images accepted by the image accepting unit 11, thereby acquiring an analysis result, select an LUT corresponding to the analysis result, and select association information from the LUT. The selecting association information may be acquiring association information, may be acquiring partial information (e.g., second image-related information or physical property information) contained in the association information, or may be acquiring information for identifying the association information.

Furthermore, for example, the image analysis unit 12 analyzes the whole or part of the one or more images accepted by the image accepting unit 11, thereby acquiring first image-related information, and acquires association information associated with the first image-related information. The first image-related information is, for example, a vicinity feature amount, a whole feature amount, or the like of the images, as described above.

Note that, if the image analysis unit 12 analyzes part of the one or more images accepted by the image accepting unit 11, the image analysis unit 12 typically divides the one or more images accepted by the image accepting unit 11, thereby acquiring two or more spatiotemporal blocks. It is assumed that the spatiotemporal blocks include blocks obtained by spatially dividing one image, and blocks obtained by temporally dividing multiple images.

The digital processing unit 13 performs digital processing on the one or at least two images accepted by the image accepting unit 11, thereby acquiring one or at least two processed images. The digital processing is, for example, processing that increases a resolution, processing that changes a pixel value, processing that changes a luminance, processing that changes a brightness, or the like. The digital processing may be any processing as long as it is digital processing on an image.

Furthermore, the digital processing unit 13 may perform digital processing on the one or at least two images accepted by the image accepting unit 11, using physical property information acquired by the physical property information acquiring unit 14 (described later), thereby acquiring one or at least two processed images. The physical property information is, for example, information relating to a display screen area, information relating to a spatiotemporal resolution, information relating to a light intensity, information relating to a display position, information relating to an optical axis orientation, or the like.

Furthermore, the digital processing unit 13 may perform digital processing on the one or at least two images accepted by the image accepting unit 11, using after-processing information, which is information obtained after the physical property processing unit 15 (described later) performs the physical property processing, thereby acquiring one or at least two processed images. The after-processing information is, for example, output image information, user reaction information, or the like. The output image information is information relating to one or at least two processed images output by the output unit 16, and examples thereof include a vicinity feature amount and a whole feature amount of a processed image or an image obtained by capturing an image of a processed image, information indicating a light region or a dark region on a screen, whether or not the luminance is non-uniform, information indicating a region in which the luminance is non-uniform, a degree of focusing, a time response (flicker, reaction speed), information relating to a screen face (distance from a screen, orientation of a screen), and the like. The user reaction information is information relating to a user viewing a processed image, and examples thereof include information relating to a movement of the eyes of the user (eye movement), information relating to a pupillary response, information relating to a posture change, information relating to brain waves of the user, user attribute such as the sex and the age of the user, and the like. The information relating to a movement of the eyes of the user is, for example, information indicating a movement of the eyes of the user itself, or information indicating whether or not a movement of the eyes of the user is in a range equivalent to a learned movement of the eyes, or the like. The learned movement of the eyes is held, for example, by the digital processing unit 13. The learned movement of the eyes is, for example, information accepted by the image accepting unit 11 together with an image.

Specifically, for example, the digital processing unit 13 acquires the whole or part of one or at least two processed images associated with the whole or part of the one or more images accepted by the image accepting unit 11, using one piece of association information of the one or at least two pieces of association information.

Furthermore, the digital processing unit 13 may acquire the whole or part of one or at least two processed images associated with the whole or part of the one or more images accepted by the image accepting unit 11, using the association information selected by the image analysis unit 12.

Furthermore, the digital processing unit 13 may perform processing that adjusts a spatiotemporal luminance activity according to the display screen area, on the one or at least two images accepted by the image accepting unit 11. It is preferable that processing is performed such that the spatiotemporal luminance activity is increased as the display screen area increases. That is to say, for example, the digital processing unit 13 has a correspondence table having two or more records each indicating a correspondence between a display screen area and a spatiotemporal luminance activity, determines a spatiotemporal luminance activity from an acquired display screen area, using the correspondence table, and performs processing on an image that is to be processed, so as to realize the spatiotemporal luminance activity. For example, the digital processing unit 13 may have an arithmetic expression for determining a spatiotemporal luminance activity, using a display screen area as a parameter, substitute an acquired display screen area for this arithmetic expression, thereby determining a spatiotemporal luminance activity, and perform processing on an image that is to be processed, so as to realize the spatiotemporal luminance activity.

Further, the digital processing unit 13 may perform digital processing on two or more types of images, thereby acquiring two or more types of processed images. The two or more types of images are two or more images obtained by capturing images of one target in different environments.

In the restrictive condition storage part 131 forming the digital processing unit 13, one or more restrictive conditions regarding a pixel and a region contained in an image can be stored. A restrictive condition herein is, for example, a condition to be applied to an image that is to be output, and is a condition acquired from a subject. The restrictive condition is typically a condition for causing an image to match a natural rule. The restrictive condition typically refers to processing that restores changed information, with digital processing and physical property processing (it may be referred to as analog compensation processing). The restrictive condition is, for example, a condition regarding a luminance value of a pixel contained in an image. The restrictive condition is, for example, a condition regarding a relationship between two or more pixels contained in an image. The condition for causing an image to match a natural rule is, for example, not to disrupt a relationship between multiple objects contained in a target. The relationship between objects is, for example, a difference between depth appearances, between brightnesses, or the like of objects.

The relationship between pixels is, for example, a difference between luminances of pixels, a difference between pixel values of pixels, or the like. The restrictive condition is, for example, a maximum range of a spatiotemporal activity of luminance, a maximum range of a spatiotemporal activity of pixel value, a maximum range of a spatiotemporal activity of brightness, or the like. The restrictive condition is, for example, a condition regarding a luminance value of a region contained in an image. The luminance value of a region is an average luminance, a maximum luminance, a minimum luminance, or the like of a certain spatiotemporal block in an image. The restrictive condition is, for example, condition regarding an activity of a region contained in an image. An activity of a region herein is a frequency distribution, a dynamic range or the like of a certain spatiotemporal block in an image. Specifically, the restrictive condition is a condition for ensuring that, for example, a screen region closer to a viewer has a higher luminance and a screen region farther therefrom has a lower luminance. The restrictive condition is, for example, condition for ensuring that an object closer to a viewer has a higher resolution feeling and an object farther therefrom has a lower resolution feeling. The resolution feeling refers to fine appearance of an image, beautiful appearance of an image, high-quality appearance of an image, noiseless appearance of an image, or natural appearance of an image, or the like.

Note that the resolution feeling can be determined, for example, by performing frequency analysis. Specifically, for example, frequency analysis may be performed on an image or part of an image (e.g., spatiotemporal block, etc.), thereby determining that a resolution feeling is higher as a ratio of high-frequency components increases and a resolution feeling is lower as a ratio of low-frequency components increases. More specifically, the resolution feeling may be quantitatively determined (e.g., in five levels of 1 to 5) according to the ratio of high-frequency components at a first threshold or more. That is to say, it is determined that a resolution feeling is higher as a ratio of high-frequency components at a threshold or more increases. Also, frequency analysis may be performed, thereby acquiring a frequency distribution, and the resolution feeling may be quantitatively determined according to the frequency distribution. Also in this case, it is typically determined that a resolution feeling is higher as a ratio of high-frequency components increases and a resolution feeling is lower as a ratio of low-frequency components increases.

Furthermore, the resolution feeling can be determined, for example, using an activity of pixel values in a space (referred to as a spatial activity). Specifically, for example, it may be determined that a resolution feeling is higher as a ratio of pixels having a spatial activity at a first threshold or more increases. Also, it may be determined that the resolution feeling may be quantitatively determined (e.g., in five levels of 1 to 5) according to the ratio of pixels with a spatial activity at a first threshold or more. Note that there is no limitation on a method for determining a resolution feeling or acquiring a resolution feeling.

Furthermore, the restrictive condition is, for example, a condition using a pixel value of a pixel contained in a field as a parameter. The restrictive condition is, for example, a condition using a temporal activity of pixel value, which is an amount of change in a pixel value of pixels in temporally successive two or more fields, as a parameter. The restrictive condition is, for example, a condition using a spatial activity of pixel value, which is a difference between pixel values of two or more pixels contained in one field, as a parameter. More specifically, the restrictive condition is a condition for ensuring that, for example, a temporal activity of pixel value is in a constant predetermined area (it may be an area defined by a function of time t). Specifically, the restrictive condition is a condition for ensuring that, for example, a spatial activity of pixel value is in a constant predetermined area (it may be an area defined by a function of distance x from a reference point).

In the field-of-view area information storage part 132, field-of-view area information, which is information relating to a field-of-view area, can be stored. The field-of-view area information is, for example, a field-of-view angle (it may be referred to as an angle of view), a zoom factor, information indicating a region or a size in a field-of-view area (e.g., "vertical: 9 m, horizontal: 16 m"), or the like.

The digital processing part 133 performs digital processing on the one or at least two images accepted by the image accepting unit 11. As described above, there is no limitation on the content of the digital processing. It is preferable that the digital processing part 133 changes a pixel contained in the one or at least two images accepted by the image accepting unit 11 such that the one or more restrictive conditions are satisfied by the one or at least two images, thereby acquiring one or at least two processed images. The changing a pixel is changing a pixel value or the like. Furthermore, it is preferable that the digital processing part 133 changes a region contained in the one or at least two images accepted by the image accepting unit 11 such that the one or more restrictive conditions are satisfied by the one or at least two images, thereby acquiring one or at least two processed images. The changing a region is changing a pixel value in a spatiotemporal block or the like. In this case, it is preferable to change a spatiotemporal resolution or a tone of the spatiotemporal block.

Furthermore, the digital processing part 133 may change a luminance value of a pixel contained in the one or at least two images accepted by the image accepting unit 11 such that the one or more restrictive conditions stored in the restrictive condition storage part 131 are satisfied, thereby acquiring one or at least two processed images.

Furthermore, the digital processing part 133 may change a pixel and a region contained in the one or at least two images accepted by the image accepting unit 11 such that the one or more restrictive conditions are satisfied in an area in the one or at least two images, the area being a field-of-view area indicated by the field-of-view area information stored in the field-of-view area information storage part 132, thereby acquiring one or at least two processed images. In this case, the digital processing part 133 changes a pixel, while changing the field-of-view area indicated by the field-of-view area information, such that the one or more restrictive conditions are satisfied by a field-of-view area image indicated by each piece of field-of-view area information, in the image, thereby acquiring one or at least two processed images.

The physical property information acquiring unit 14 acquires physical property information, which is information relating to a lost physical property, in the one or at least two images accepted by the image accepting unit 11. The lost physical property is a physical property that has been lost compared with one or more physical properties of a target contained in an image. Furthermore, the physical property information acquiring unit 14 may acquire physical property information, using one or at least two images or one or at least two processed images.

The physical property information acquiring unit 14 may acquire physical property information, using one piece of association information of the one or at least two pieces of association information. More specifically, the physical property information acquiring unit 14 may acquire physical property information, using information for acquiring physical property information contained in one piece of association information of the one or at least two pieces of association information. The association information is typically the association information selected by the image analysis unit 12.

Furthermore, the physical property information acquiring unit 14 may acquire physical property information, using one piece of association information of the pieces of association information in one look-up table of the two or more look-up tables. The look-up table and the association information are typically the look-up table and the association information selected by the image analysis unit 12.

Furthermore, the physical property information acquiring unit 14 may acquire physical property information, which is information for controlling optical output of the multiple output units 16.

Furthermore, the physical property information acquiring unit 14 may acquire information relating to a display screen area corresponding to a size of a target contained in the one or at least two images accepted by the image accepting unit 11. The information relating to the display screen area may be a field-of-view angle, a zoom level, or the like.

Furthermore, the physical property information acquiring unit 14 may acquire, for each of the multiple output units 16, portion specifying information for specifying a partial image, which is an image of a portion forming the processed image, and is an image output by that output unit 16. It is preferable that the portion specifying information is determined such that a high-resolution partial image is output for a portion requiring a high resolution. Each of the multiple output units 16 outputs a partial image specified with the corresponding portion specifying information. The portion requiring a high resolution is, for example, a portion with a high activity, a portion important for a viewer, in the image.

Further, the physical property information acquiring unit 14 may acquire physical property information, which is information for specifying the whole or part of the two or more types of processed images.

The physical property processing unit 15 performs physical property processing indicated by the physical property information, using one or at least two processed images. The physical property processing is processing for adding a physical property. The physical property processing may be referred to as processing for reproducing a lost physical property. The physical property processing is, for example, processing that sets a size, a field-of-view angle, or the like, of a processed image, which is an output image.

Furthermore, it is preferable that, in a case where the one or at least two processed images are to be optically output, the physical property processing unit 15 performs control for optical output, according to the physical property information. The control for optical output is, for example, control of a light intensity, control of a field-of-view angle at the time of output, or the like.

Furthermore, the physical property processing unit 15 may set a light intensity in a case where optical output is to be performed, according to the physical property information.

Furthermore, the physical property processing unit 15 may set a field-of-view angle, according to the physical property information.

Furthermore, the physical property processing unit 15 may perform control for optical output of the multiple output units 16, according to the physical property information.

Furthermore, the physical property processing unit 15 may set the information relating to the display screen area.

Furthermore, the physical property processing unit 15 may instruct the multiple output units 16 to output the whole or part of two or more processed images in an overlapping manner, according to the physical property information.

In the physical property restrictive condition storage part 151 forming the physical property processing unit 15, one or more restrictive conditions regarding the physical property information can be stored. A restrictive condition herein is a physical property restrictive condition, and examples thereof include a maximum value of a lamplight intensity, a maximum value of a change in the lamplight intensity (maximum value of a spatiotemporal activity of the light intensity), a relationship between lamplight intensities of multiple output units, or the like, for restraining brightness.

Furthermore, the physical property processing part 152 changes the physical property information such that the one or more physical property restrictive conditions are satisfied by one or at least two images that are to be output by the output unit 16, thereby acquiring one or at least two processed images.

Each output unit 16 outputs a processed image subjected to the physical property processing. The processed image subjected to the physical property processing may be referred to as an output image. The outputting a processed image subjected to the physical property processing may be outputting a processed image according to a parameter (e.g., light intensity, field-of-view angle, etc.) set by the physical property processing.

Furthermore, the output unit 16 may output one or at least two processed images subjected to the control for optical output, based on the control for optical output performed by the physical property processing unit 15.

Furthermore, the output unit 16 may output one or at least two processed images, according to the set light intensity.

Furthermore, the output unit 16 may output one or at least two processed images, according to the set field-of-view angle.

Furthermore, the output unit 16 may output one or at least two processed images, according to the information relating to the display screen area.

Furthermore, each of the multiple output units 16 may output a partial image specified with the corresponding portion specifying information.

Furthermore, the multiple output units 16 may output the whole or part of two or more processed images in an overlapping manner, according to an instruction from the physical property processing unit 15. The instruction from the physical property processing unit 15 is an instruction for outputting the whole or part of two or more processed images in an overlapping manner, according to the physical property information.

The output is projection using a projector, display on a display screen, or the like. The output units 16 may be realized by a display such as a projector or an organic EL display. The output units 16 may be considered to be realized by driver software for a display device and the display device, or the like.

Furthermore, in the output restrictive condition storage part 161, one or more restrictive conditions regarding output can be stored. A restrictive condition herein is a restrictive condition regarding output, and may be referred to as an output restrictive condition.

The output part 162 changes the one or at least two processed images such that the one or more restrictive conditions stored in the output restrictive condition storage part 161 are satisfied by one or at least two images that are to be output, and outputs the changed one or at least two processed images. The output is as described above.

The output image information acquiring unit 17 acquires output image information, which is information relating to the one or at least two processed images output by the output unit 16. The output image information is, for example, information obtained by capturing an image of an output image. The output image information is, for example, a vicinity feature amount, a whole feature amount, or the like of an image obtained by capturing an image of an output image, as described above. The output image information acquiring unit 17 may be realized by a camera and software, for example.

The output parameter acquiring unit 18 acquires one or more parameters when the output unit 16 outputs a processed image. A parameter herein is, as described above, a light intensity, a field-of-view angle, or the like held by the output unit 16.

The user reaction information acquiring unit 19 acquires user reaction information, which is information relating to a reaction of a user viewing a processed image. The user reaction information is, for example, information indicating a movement of the eyes, a feature amount of a movement of the eyes, pupils' state information of the eyes, information indicating a movement of the face, or the like, as described above. The movement of the eyes is, for example, information acquired using eye tracking. The pupils' state information of the eyes is, for example, a pupil diameter of the eyes, or the like.

The user reaction information acquiring unit 19 may be realized by a camera and an eye tracking apparatus, or the like.

The storage unit 10, the restrictive condition storage part 131, the field-of-view area information storage part 132, the physical property restrictive condition storage part 151, and the output restrictive condition storage part 161 are preferably a non-volatile storage medium, but may be realized also by a volatile storage medium. There is no limitation on the procedure in which the information is stored in the storage unit 10 and the like. For example, the information may be stored via a storage medium, the information transmitted via a communication line or the like may be stored, or the information input via an input device may be stored.

The image analysis unit 12, the digital processing unit 13, the physical property information acquiring unit 14, the physical property processing unit 15, the output parameter acquiring unit 18, the digital processing part 133, and the physical property processing part 152 may be realized typically by an MPU, a memory, or the like. Typically, the processing procedure of the image analysis unit 12 and the like is realized by software, and the software is stored in a storage medium such as a ROM. Note that the processing procedure may be realized also by hardware (a dedicated circuit).

Next, an operation of the image processing apparatus 1 will be described with reference to the flowchart in FIG. 2.

(Step S201) The image accepting unit 11 judges whether or not one or more images have been accepted. If one or more images have been accepted, the procedure advances to step S202, and, if not, the procedure returns to step S201. An image herein is typically video configured by two or more still images.

(Step S202) The image analysis unit 12 spatially, temporally, or spatially and temporally divides each image accepted in step S201, into two or more portions, thereby acquiring two or more spatiotemporal blocks.

(Step S203) The image analysis unit 12 substitutes 1 for a counter i.

(Step S204) The image analysis unit 12 judges whether or not there is an i-th block among the spatiotemporal blocks acquired in step S202. If there is an i-th block, the procedure advances to step S205, and, if not, the procedure advances to step S208.

(Step S205) The image analysis unit 12 performs image analysis processing on the i-th spatiotemporal block. This image analysis processing will be described later with reference to the flowchart in FIG. 3. Note that, in the image analysis processing, after-processing information acquired in step S211 may be used.

(Step S206) The digital processing unit 13 performs digital processing on the i-th spatiotemporal block, thereby acquiring part or the whole of a processed image corresponding to the i-th spatiotemporal block. This digital processing will be described later with reference to the flowchart in FIG. 4. Note that, in the digital processing, after-processing information acquired in step S211 may be used.

(Step S207) The image analysis unit 12 increments the counter i by 1, and the procedure returns to step S204.

(Step S208) The physical property information acquiring unit 14 acquires physical property information regarding a lost physical property of the images accepted by the image accepting unit 11. The physical property information acquiring method is, for example, as described above.

(Step S209) The physical property processing unit 15 performs physical property processing, using the processed images, according to the physical property information acquired in step S208.

(Step S210) The output unit 16 outputs the processed images subjected to the physical property processing.

(Step S211) One or more of the output image information acquiring unit 17, the output parameter acquiring unit 18, and the user information acquiring unit 19 acquire after-processing information. The after-processing information is, for example, output image information, one or more parameters when the output unit 16 outputs a processed image, user information, or the like. The procedure returns to step S201.

Figure 2:
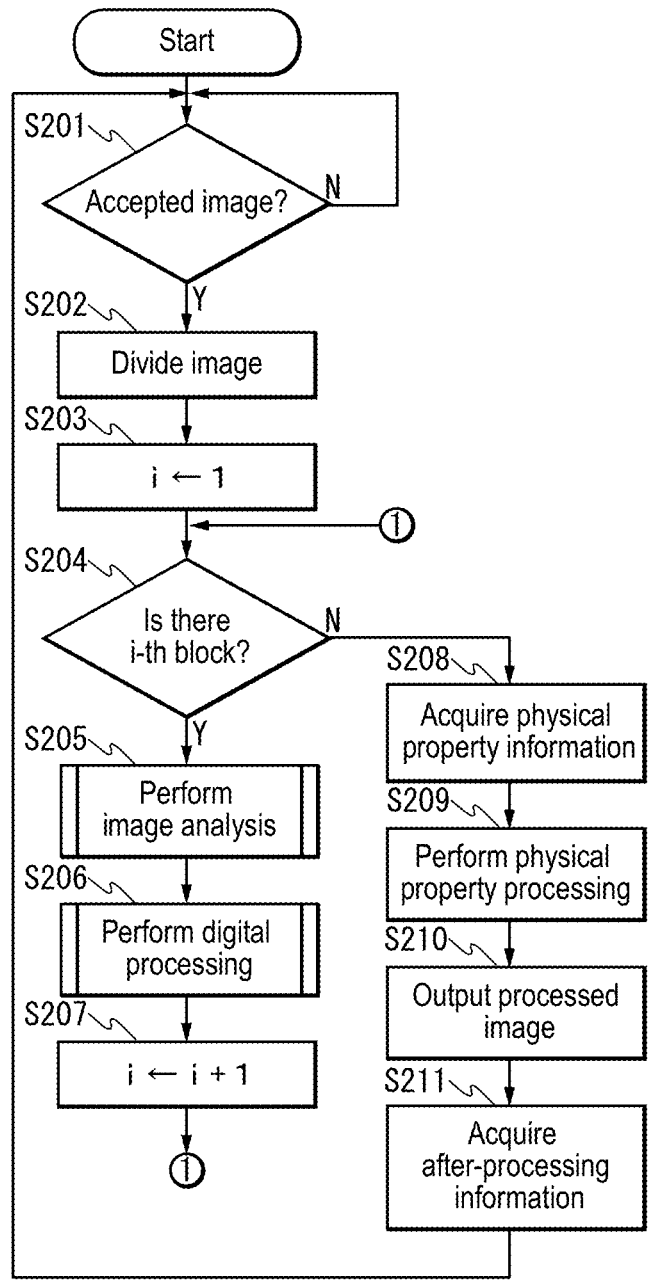
FIG. 2 is a flowchart illustrating an operation of the image processing apparatus 1 in the embodiment.

Note that, in the flowchart in FIG. 2, the image dividing processing is performed in step S202, but the image dividing processing does not have to be performed. In this case, the number of blocks is one.

Furthermore, in the flowchart in FIG. 2, the physical property information acquiring processing and the physical property processing in steps S208 and S209 are performed in units of images accepted by the image accepting unit 11, but they may be performed in units of spatiotemporal blocks obtained by division.

Furthermore, in the flowchart in FIG. 2, the physical property processing is performed after the digital processing. However, the digital processing may be performed after the physical property processing, or the digital processing and the physical property processing may be performed in parallel.

Furthermore, in the flowchart in FIG. 2, the after-processing information acquiring processing in step S211 may not be performed.

Note that the procedure is terminated by powering off or an interruption at completion of the process in the flowchart in FIG. 2.

Next, the image analysis processing in step S205 will be described with reference to the flowchart in FIG. 3.

(Step S301) The image analysis unit 12 performs image analysis on the i-th spatiotemporal block, thereby acquiring a feature amount vector (referred to as a first feature amount vector), which is one or more feature amounts. The image analysis unit 12 may acquire after-processing information and make it to be included in the feature amount vector. The one or more feature amounts are, for example, one or more feature amounts of the vicinity feature amount and/or the whole feature amount described above. For example, the one or more feature amounts are, for example, a maximum value (MAX) and a minimum value (MIN), a dynamic range (DR=MAX−MIN), a luminance level distribution, a difference in the time direction, or the like of multiple pixels. The technique for acquiring such one or more feature amounts from an image is a known technique, and, thus, a detailed description thereof has been omitted. It will be appreciated that the feature amounts are not limited to those described above.

(Step S302) The image analysis unit 12 substitutes 1 for a counter i.

(Step S303) The image analysis unit 12 judges whether or not there is an i-th piece of association information in the LUT in the storage unit 10. If there is an i-th piece of association information, the procedure advances to step S304, and, if not, the procedure advances to step S307. In the case where there are two or more LUTs in the storage unit 10, one of the LUTs may be used in this step. It is also possible to, after performing type identifier acquiring processing (described later), use an LUT associated with a type identifier acquired in the type identifier acquiring processing.

(Step S304) The image analysis unit 12 acquires a feature amount vector (referred to as a second feature amount vector) contained in the i-th piece of association information.

(Step S305) The image analysis unit 12 calculates a distance between the first feature amount vector acquired in step S301 and the second feature amount vector acquired in step S304, and temporarily stores this distance in a buffer in association with i (i-th piece of association information).

(Step S306) The image analysis unit 12 increments the counter i by 1, and the procedure returns to step S303.

(Step S307) The image analysis unit 12 selects association information with the smallest distance, from among the distances stored in the buffer. The procedure returns to the upper-level processing. The processing that selects association information is processing that determines the whole or part of a processed image.

Figure 3:
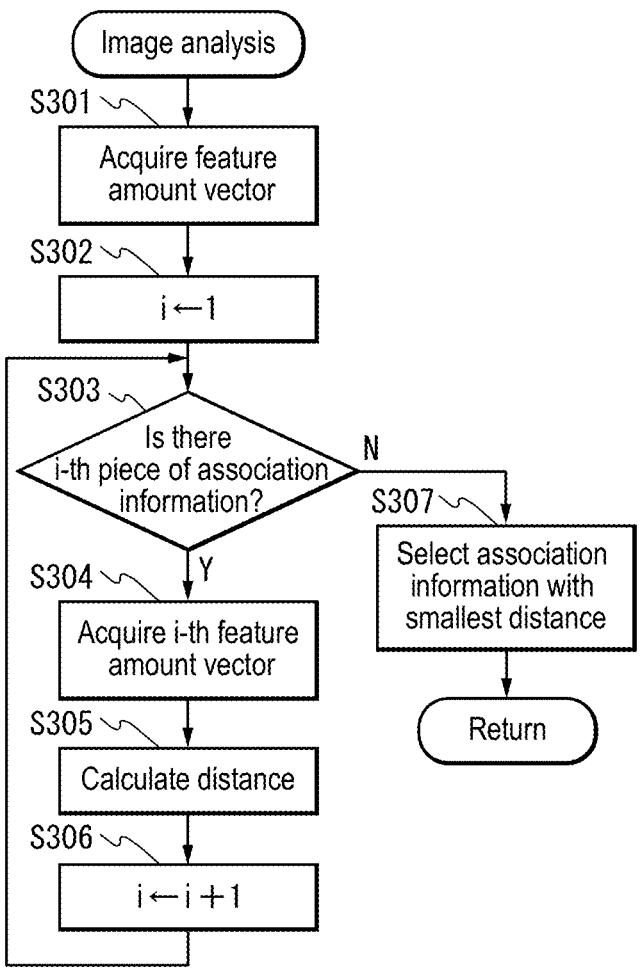
FIG. 3 is a flowchart illustrating image analysis processing in the embodiment.

Note that, in the flowchart in FIG. 3, the association information may have an ID (or an address), and an ID (or an address) may be acquired, for example, by substituting one or more feature amounts for an arithmetic expression stored in advance. That is to say, there is no limitation on the image analysis processing method.

Next, an example of the digital processing in step S206 will be described with reference to the flowchart in FIG. 4.

(Step S401) The digital processing part 133 forming the digital processing unit 13 acquires a type identifier for identifying a type of look-up table that is to be used. An example of the type identifier acquiring processing will be described later with reference to the flowchart in FIG. 5.

(Step S402) The digital processing part 133 acquires a group of parameters, in the association information that is in the look-up table associated with the type identifier acquired in step S401, and that is associated with the whole or part of the first image determined by the image analysis unit 12.

(Step S403) The digital processing part 133 generates the whole or part of a processed image associated with the whole or part of the image determined by the image analysis unit 12, using the group of parameters acquired in step S402. More specifically, for example, the digital processing part 133 substitutes the group of parameters acquired in step S402 for an arithmetic expression stored in advance, thereby executing the arithmetic expression. The digital processing part 133 acquires the whole or part of a processed image.

(Step S404) The digital processing part 133 reads a restrictive condition from the restrictive condition storage part 131.

(Step S405) The digital processing part 133 judges whether or not the restrictive condition read in step S404 is satisfied by the whole or part of the processed image acquired in step S403, and substitutes the judgment result for the buffer.

(Step S406) If the judgment result in step S405 is "restrictive condition is satisfied (matched)", the procedure advances to step S407, and, if the result is "restrictive condition is not satisfied (not matched)", the procedure advances to step S408.

(Step S407) The digital processing part 133 obtains the whole or part of the processed image acquired in step S403, as the whole or part of the final processed image. The procedure returns to the upper-level processing.

(Step S408) The digital processing part 133 changes the whole or part of the second image acquired in step S403 such that the restrictive condition is satisfied, thereby acquiring a new processed image.

(Step S409) The digital processing part 133 obtains the processed image acquired in step S408, as the whole or part of the final processed image. The procedure returns to the upper-level processing.

Figure 4:
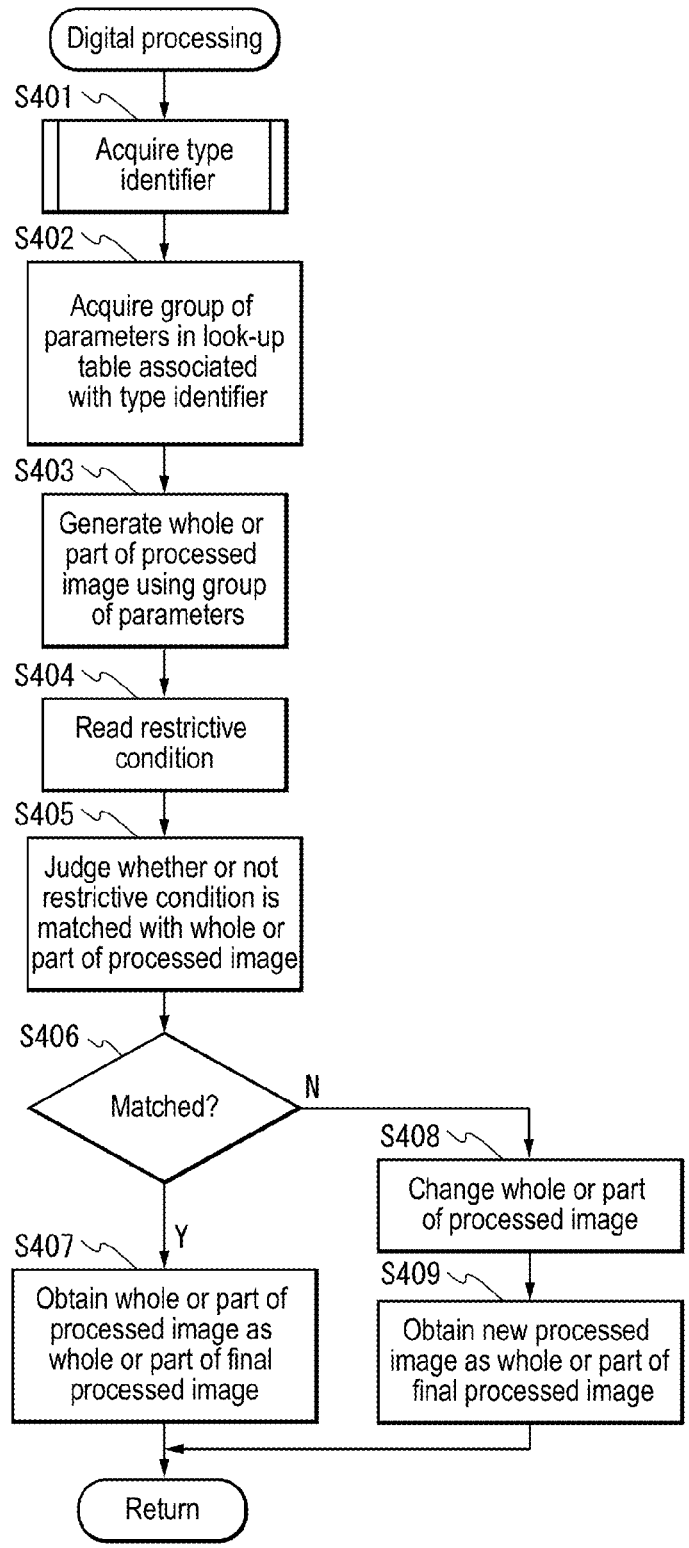
FIG. 4 is a flowchart illustrating digital processing in the embodiment.

Note that, in the flowchart in FIG. 4, the method for generating the whole or part of a processed image or the method for acquiring the whole or part of a processed image may be other methods.

Furthermore, in the flowchart in FIG. 4, it will be appreciated that the processing in step S401 does not have to be performed in the case where the number of look-up tables in the storage unit 10 is one.

Next, an example of the type identifier acquiring processing in step S401 will be described with reference to the flowchart in FIG. 5.

(Step S501) The digital processing part 133 acquires a feature amount vector of the i-th block (first image) described above.

(Step S502) The digital processing part 133 substitutes 1 for a counter i.

(Step S503) The digital processing part 133 judges whether or not there is an i-th type identifier in the storage unit 10. If there is an i-th type identifier, the procedure advances to step S504, and, if not, the procedure advances to step S507.

(Step S504) The digital processing part 133 acquires a feature amount vector associated with the i-th type identifier.

(Step S505) The digital processing part 133 calculates a distance between the feature amount vector acquired in step S501 and the feature amount vector acquired in step S504, and temporarily stores this distance in a buffer in association with the i-th type identifier.

(Step S506) The digital processing part 133 increments the counter i by 1, and the procedure returns to step S503.

(Step S507) The digital processing part 133 acquires a type identifier corresponding to the smallest distance, from among the distances calculated in step S505. The procedure returns to the upper-level processing.

Figure 5:
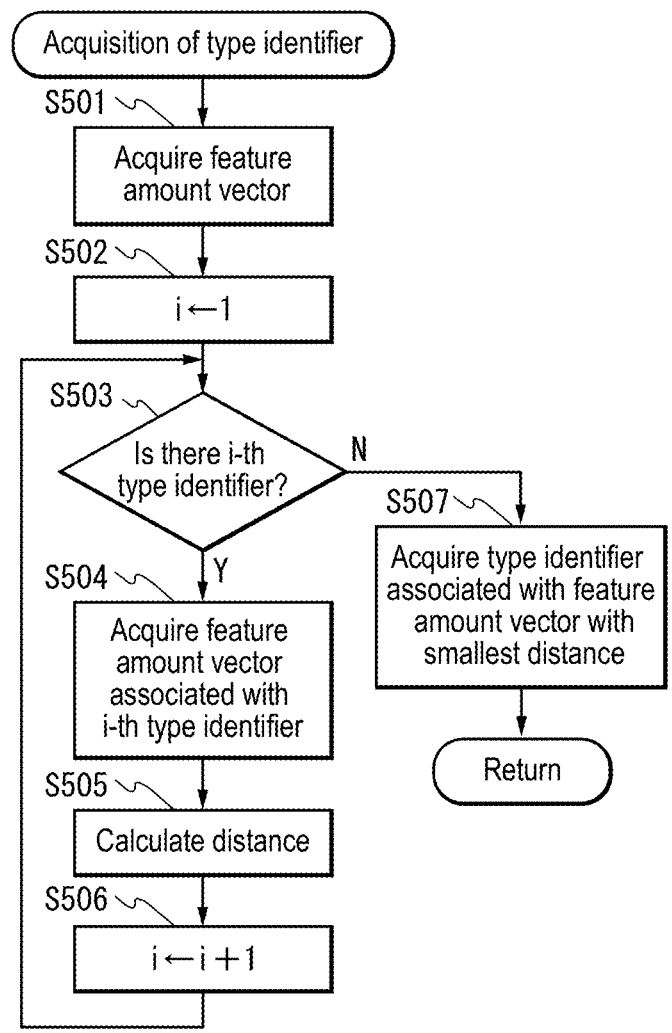
FIG. 5 is a flowchart illustrating an example of type identifier acquiring processing in the embodiment.

Note that, in the flowchart in FIG. 5, the type identifier acquiring processing may be other methods as described above. That is to say, in the flowchart in FIG. 5, although a type identifier is determined using a feature amount vector (one or more vicinity feature amounts) of a block, a type identifier may be determined using, as described above, a whole feature amount or a vicinity feature amount, using electronic program guide information or the like, or based on an instruction from the user.

Figure 6:
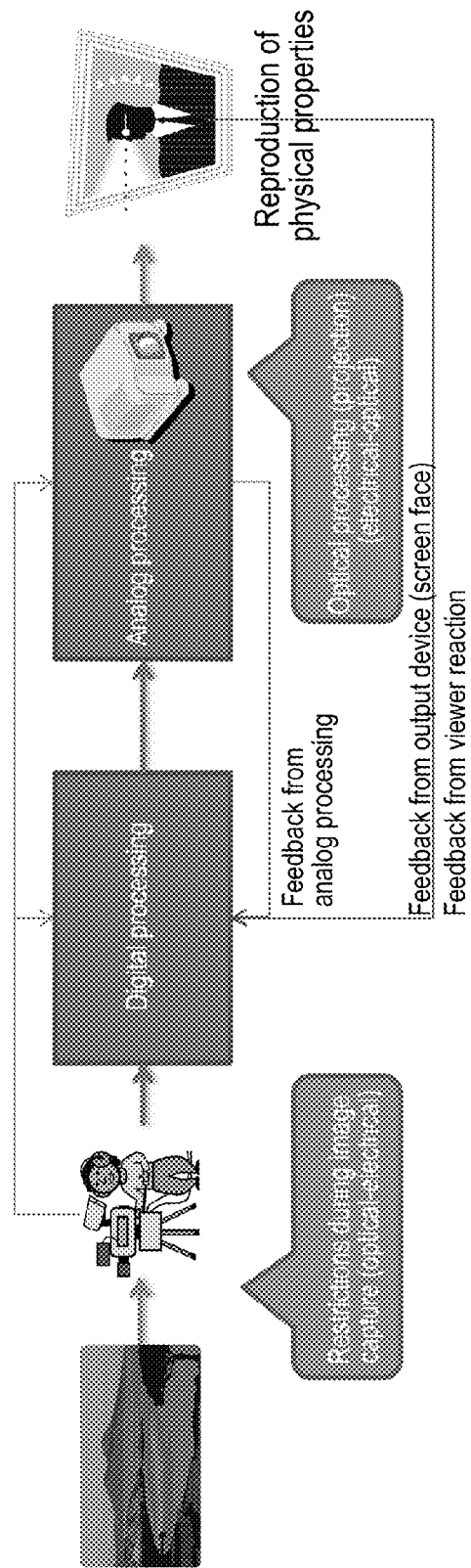
FIG. 6 is a conceptual diagram of the image processing apparatus 1 in the embodiment.

Hereinafter, specific operations of the image processing apparatus 1 in this embodiment will be described. A conceptual diagram of the image processing apparatus 1 is shown in FIG. 6. FIG. 6 shows that the image processing apparatus 1 accepts a captured image, performs digital processing and analog processing (similar to the physical property processing described above), and reproduces physical properties of a target in the captured image, the physical properties being lost in the image capture or the digital processing. FIG. 6 further shows that, in the digital processing, feedback using a result of the analog processing, feedback using information from an output device (screen face), or feedback using a viewer reaction may be performed. In FIG. 6, the analog processing is processing for controlling optical output of the output units 16 such as projectors. Furthermore, it can be said that, after performing digital processing on an accepted image, the image processing apparatus 1 performs analog processing for reproducing physical properties lost in the digital processing.

Hereinafter, five specific examples will be described.

Specific Example 1

In Specific Example 1, the image processing apparatus 1 performs optical control by analog processing (it may be referred to as analog compensation processing) such that a target (e.g., mountain) in an image has a size closer to a size in the real world in the recognition of the user, that is, such that the image is projected in a larger size. In Specific Example 1, the image processing apparatus 1 performs digital processing (it may be referred to as digital compensation processing) that adjusts a spatiotemporal luminance activity according to physical properties added by the physical property processing. Furthermore, in Specific Example 1, the image processing apparatus 1 adjusts a spatiotemporal luminance activity using an LUT, in the digital compensation processing. In this example, it is assumed that an LUT is stored in the storage unit 10, and association information contained in the LUT has a second feature amount vector, a group of parameters for performing image processing, and physical property information.

In this situation, the image accepting unit 11 accepts one or more images (they may be referred to as video). Next, the image analysis unit 12 spatially, temporally, or spatially and temporally divides the accepted video into one or at least two portions, thereby acquiring one or at least two spatiotemporal blocks. Note that, if the number of spatiotemporal blocks is one, the division is not performed.

Next, the image analysis unit 12 acquires, for each of the two or more spatiotemporal blocks, a first feature amount vector, which is a feature amount vector having information relating to a luminance of that spatiotemporal block.

Next, the image analysis unit 12 acquires, for each spatiotemporal block, association information associated with a second feature amount vector with the smallest distance between this second feature amount vector contained in the association information and the first feature amount vector, from the LUT in the storage unit 10.

Next, the digital processing unit 13 acquires, for each spatiotemporal block, a group of parameters contained in the acquired association information.

Next, the digital processing unit 13 performs image processing on each spatiotemporal block using the acquired group of parameters, thereby acquiring part or the whole of a processed image for that spatiotemporal block.

Next, the physical property information acquiring unit 14 acquires physical property information (e.g., display screen area). The physical property information acquiring unit 14 acquires one or at least two pieces of physical property information contained in the one or at least two pieces of association information associated with the one or at least two spatiotemporal blocks. The physical property information acquiring unit 14 acquires, for example, an average of one or at least two pieces of physical property information (e.g., display screen area). The information acquired by the physical property information acquiring unit 14 may be, for example, a median or the like of the physical property information, instead of an average of the physical property information.

Next, the physical property processing unit 15 performs physical property processing indicated by the physical property information. For example, the physical property processing unit 15 sets the average of the physical property information (e.g., display screen area) as a parameter of the output unit 16.

Next, the output unit 16 outputs the processed image, using the set parameter (e.g., display screen area).

Next, the image accepting unit 11 accepts new video. Next, the image analysis unit 12 divides the accepted video, thereby acquiring one or at least two spatiotemporal blocks.

Next, the image analysis unit 12 acquires, for each of the two or more spatiotemporal blocks, a first feature amount vector, which is a feature amount vector having information relating to a luminance of that spatiotemporal block.

Next, the image analysis unit 12 acquires, for each spatiotemporal block, association information associated with a second feature amount vector with the smallest distance between this second feature amount vector contained in the association information and the first feature amount vector, from among the pieces of association information in the LUT in the storage unit 10.

Figure 7:
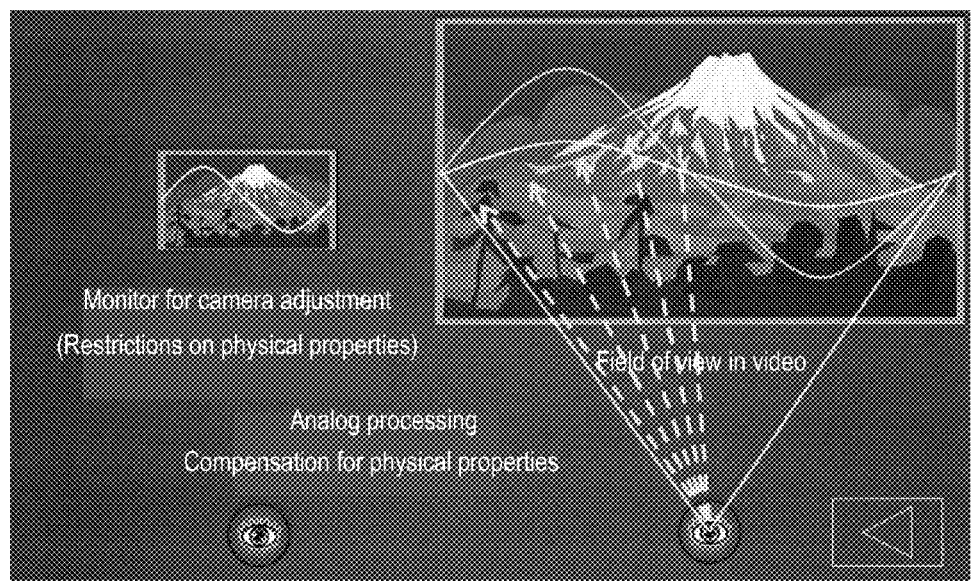
FIG. 7 is a diagram illustrating an example of specific processing by the image processing apparatus 1 in the embodiment.

Next, the digital processing unit 13 acquires, for each spatiotemporal block, a group of parameters contained in the acquired association information. As shown in FIG. 7, this group of parameters includes a parameter for adjusting a spatiotemporal luminance activity of video captured with a camera (accepted video), according to the display screen area.

Next, the digital processing unit 13 performs image processing on each spatiotemporal block using the acquired group of parameters, thereby acquiring part or the whole of a processed image for that spatiotemporal block. Compared with the image before the image processing, the spatiotemporal luminance activity of part or the whole of the processed image has been adjusted to be appropriate when the image is output in the display screen area.

Next, for example, the physical property processing unit 15 sets the average of the physical property information (e.g., display screen area) as a parameter of the output unit 16.

Next, the output unit 16 outputs the processed image, using the set parameter. The above-described processing is repeated while video is accepted.

As described above, according to Specific Example 1, a case was described in which, when outputting an image while setting a display screen area with analog compensation processing, digital compensation processing that restores a spatiotemporal luminance activity according to the display screen area is performed.

Figure 8:
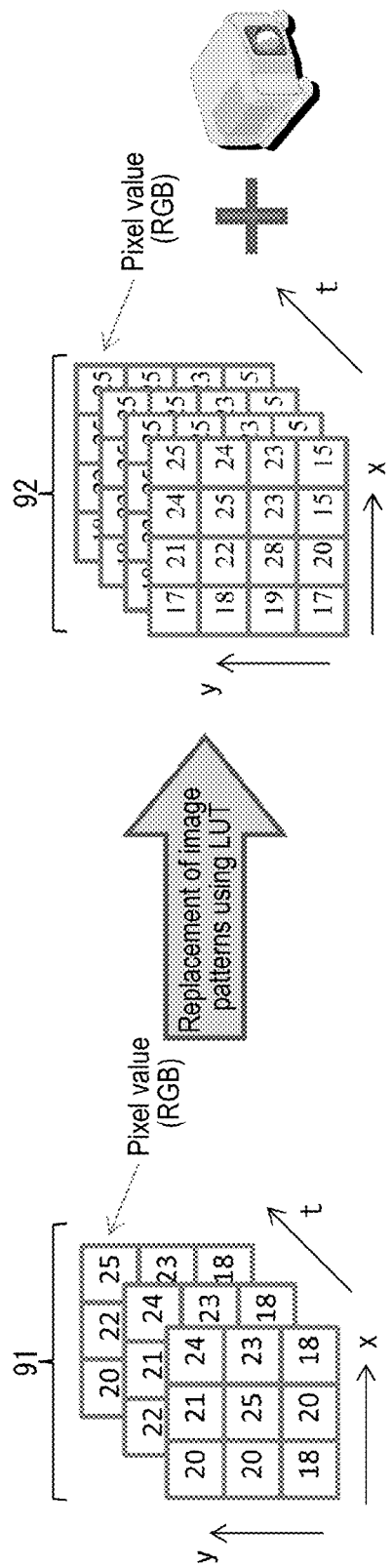
FIG. 8 is a diagram illustrating an example of specific processing by the image processing apparatus 1 in the embodiment.

For example, as shown in FIG. 8, this digital compensation processing is realized by processing that replaces image patterns in spatiotemporal blocks using the association information in an LUT. In FIG. 8, a left portion 91 refers to a group of spatiotemporal blocks obtained by spatially and temporally dividing an image (it may be referred to as an input image) accepted by the image accepting unit 11. The information on the spatiotemporal blocks and the physical property information are used to obtain part of a processed image corresponding to the spatiotemporal blocks, from the LUT stored in the storage unit 10. For example, the information obtained from the LUT may be an image itself, or may be a parameter for processing an image, such as a filter coefficient or the like. If a filter coefficient is stored, this is applied to a spatiotemporal block, which is part of an input image, thereby obtaining part of a processed image.

For example, in the LUT, a filter coefficient for increasing a spatiotemporal activity of an image according to a display screen area, which is the physical property information, may be stored. An input image and a processed image may have different spatiotemporal resolutions and tones. In the example in FIG. 8, an input image configured by spatiotemporal blocks 91 in three frames in the time direction each of which is configured by 3×3 portions in the space direction is replaced by a processed image 92 configured by four frames in the time direction each of which is configured by 4×4 divided portions in the space direction. The thus obtained processed image is optically output by an image output device, in a state of reflecting the physical property information that is the display screen area, and, thus, an image reproducing physical properties can be output. If a user views this image, a user reaction similar to that when the user actually and directly views the target is induced, and the user can feel, for example, the grandeur, the magnificence and the like of the mountain.

Specific Example 2

Specific Example 2 will describe the image processing apparatus 1 that includes multiple output units 16, and that controls output of the multiple output units 16 with analog compensation processing such that a portion requiring a high resolution in video has a resolution higher than the other portions. The output units 16 in this example are, for example, projectors. The portion requiring a high resolution in an image is, for example, a portion with a high activity, a portion important for a viewer, in the image.

Furthermore, Specific Example 2 will describe the image processing apparatus 1 that performs digital compensation processing such that a luminance change in spatiotemporal blocks becomes a smooth change, in order to reduce or remove a problem of an image with a non-uniform spatial resolution. This digital compensation processing is typically performed using a restrictive condition having information on a luminance activity area. This restrictive condition is stored in the restrictive condition storage part 131.

In this situation, the image accepting unit 11 accepts video. Next, the image analysis unit 12 divides the accepted video, thereby acquiring one or at least two spatiotemporal blocks.

Next, the image analysis unit 12 acquires, for each of the two or more spatiotemporal blocks, a first feature amount vector, which is a feature amount vector having information relating to a luminance of that spatiotemporal block. In this example, the first feature amount vector contains information on a spatial activity of pixel value. It is assumed that a spatial block having a larger spatial activity of pixel value has a larger change in the image in the block, so that the spatial block can be judged to be an important portion.

Next, the image analysis unit 12 acquires, for each spatiotemporal block, association information associated with a second feature amount vector with the smallest distance between this second feature amount vector contained in the association information and the first feature amount vector, from among the pieces of association information in the LUT in the storage unit 10.

Next, the physical property information acquiring unit 14 acquires, for each spatiotemporal block, physical property information (resolution, in this example) contained in the association information corresponding to that spatiotemporal block.

Next, the physical property processing unit 15 performs physical property processing indicated by the physical property information. For example, the physical property processing unit 15 sets the resolution of one or more output units 16 corresponding to each spatiotemporal block, among the two or more output units 16, to the resolution acquired by the physical property information acquiring unit 14. Alternatively, for example, the physical property processing unit 15 passes, to an output unit 16 that can output an image having the same resolution as the resolution corresponding to each spatiotemporal block, a processed image of that spatiotemporal block and information indicating a region thereof (information indicating a spatial region in the screen), and gives an instruction to output the processed image.

Next, the digital processing unit 13 acquires, for each spatiotemporal block, a group of parameters contained in the acquired association information.

Next, the digital processing unit 13 performs image processing on each spatiotemporal block using the acquired group of parameters, thereby acquiring part or the whole of a processed image for that spatiotemporal block.

Next, the digital processing part 133 of the digital processing unit 13 reads a restrictive condition from the restrictive condition storage part 131.

Next, the digital processing part 133 judges whether or not the read restrictive condition is satisfied by the acquired whole or part of the processed image. In a case where the restrictive condition is not satisfied, the digital processing part 133 changes the acquired whole or part of the processed image such that restrictive condition is satisfied, thereby acquiring a new processed image. The case in which the restrictive condition is not satisfied refers to, for example, a case in which the brightness of the whole of an image is not uniform, a case in which a change between resolutions of adjacent pixels is not a continuous change (a case in which a difference between resolutions of adjacent pixels is at a threshold or more), or the like.

Next, each of the two or more output units 16 outputs the processed image subjected to the physical property processing and the digital processing.

Figure 9:
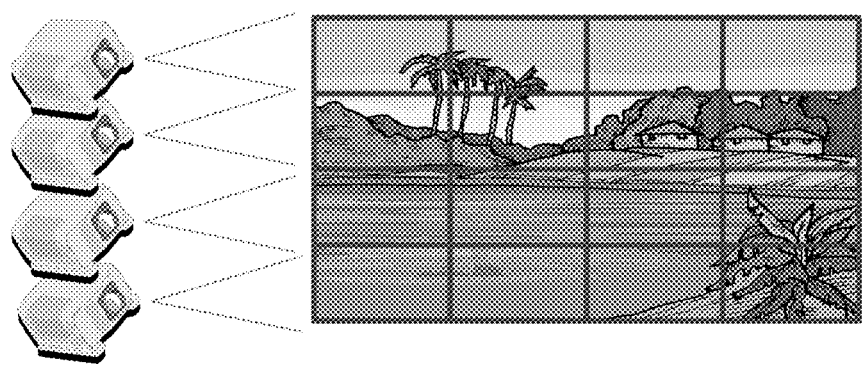
FIG. 9 is a diagram illustrating an example of specific processing by the image processing apparatus 1 in the embodiment.
Figure 10:
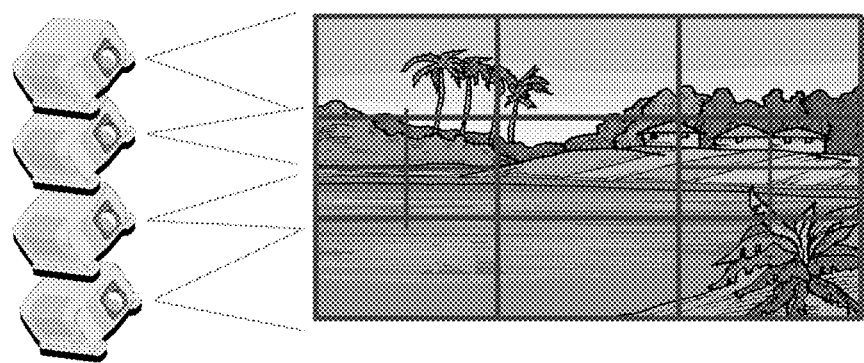
FIG. 10 is a diagram illustrating an example of specific processing by the image processing apparatus 1 in the embodiment.
Figure 11:
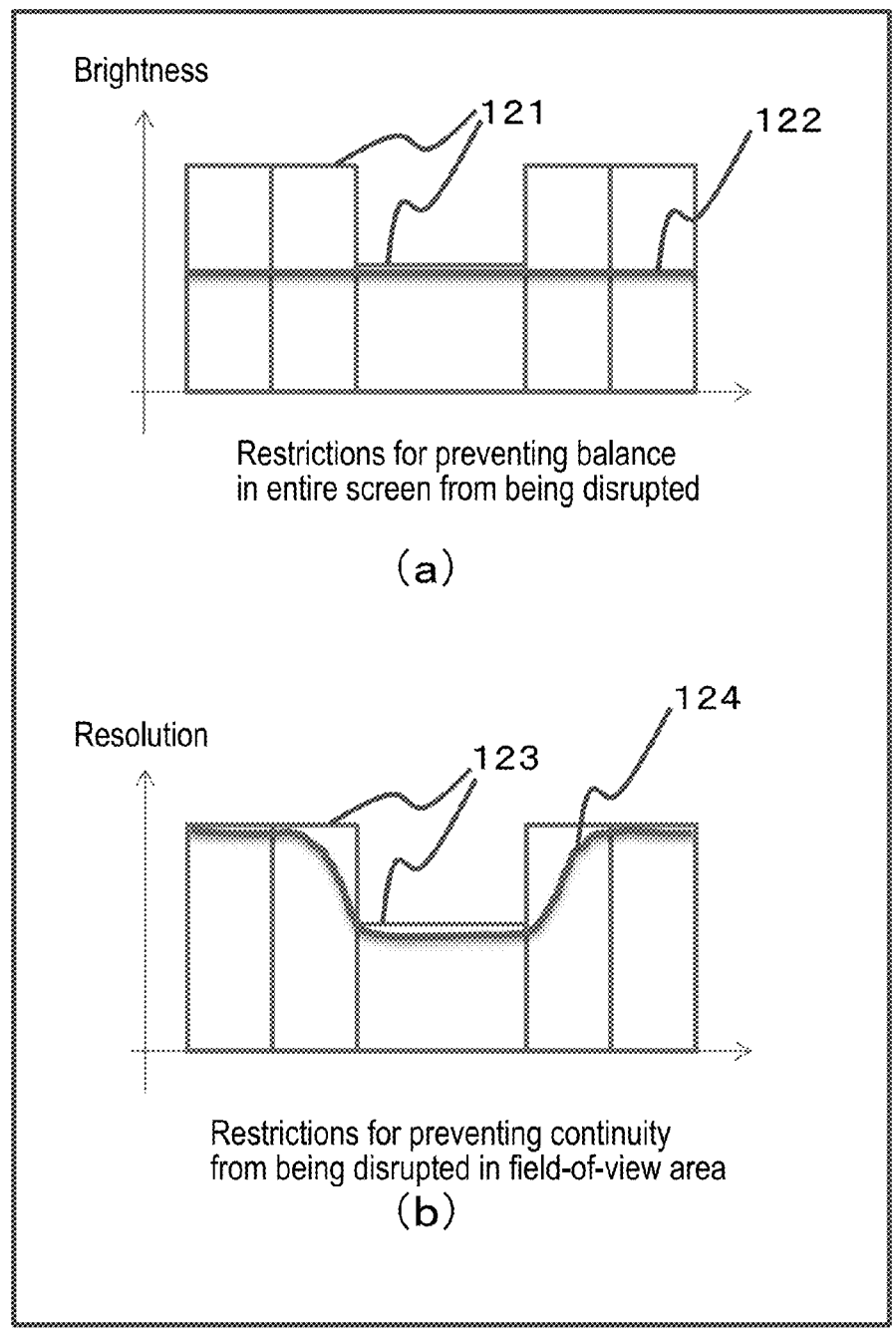
FIG. 11 shows graphs illustrating an example of specific processing by the image processing apparatus 1 in the embodiment.

Hereinafter, Specific Example 2 will be more specifically described. In the case of outputting video using multiple projectors, as shown in FIG. 9, typically, the multiple projectors output images with the same area size at the same resolution, and an image with a uniform spatial resolution is output. However, an image with a uniform spatial resolution is not preferable for a viewer (i.e., user) because an important portion and a non-important portion have the same resolution. The image processing apparatus 1 of Specific Example 2 generates video with a non-uniform resolution such that an important portion has a higher resolution as shown in FIG. 10. If video with a non-uniform resolution is generated, typically, as shown in FIG. 11, the brightness of the entire screen becomes non-uniform (see 121 in FIG. 11(a)), the continuity of the resolution is disrupted (see 123 in FIG. 11(a)), so that the image cannot be clearly seen. However, according to the image processing apparatus 1 of Specific Example 2, the digital processing using the restrictive condition and the LUT is performed such that the brightness of the screen is made uniform and the continuity of the resolution can be maintained. Note that the continuity of the resolution may be maintained by the digital processing part 133, in the field-of-view area. In this case, the field-of-view area information is held by the field-of-view area information storage part 132. The digital processing part 133 applies the restrictive condition, within the field-of-view area indicated by the field-of-view area information, and judges whether or not the restrictive condition is satisfied.

Specific Example 3

Specific Example 3 will describe the image processing apparatus 1 that, for example, in a case where video obtained by capturing images of a wide area has lost its physical properties due to lack of sufficient tones in a field-of-view area, reproduces the physical properties to the fullest extent possible.

In Specific Example 3, for example, the image processing apparatus 1 includes two projectors. It is assumed that the image accepting unit 11 accepts video obtained by capturing images of the whole of the wide area with correct exposure (hereinafter, referred to as video A) and video obtained by capturing images with correct exposure within a dark area (hereinafter, referred to as video B). For example, it is assumed that the shutter speed when capturing images of the video A is 1/200 s, and the shutter speed when capturing images of the video B is four times slower than that, i.e., 1/50 s.

Figure 12:
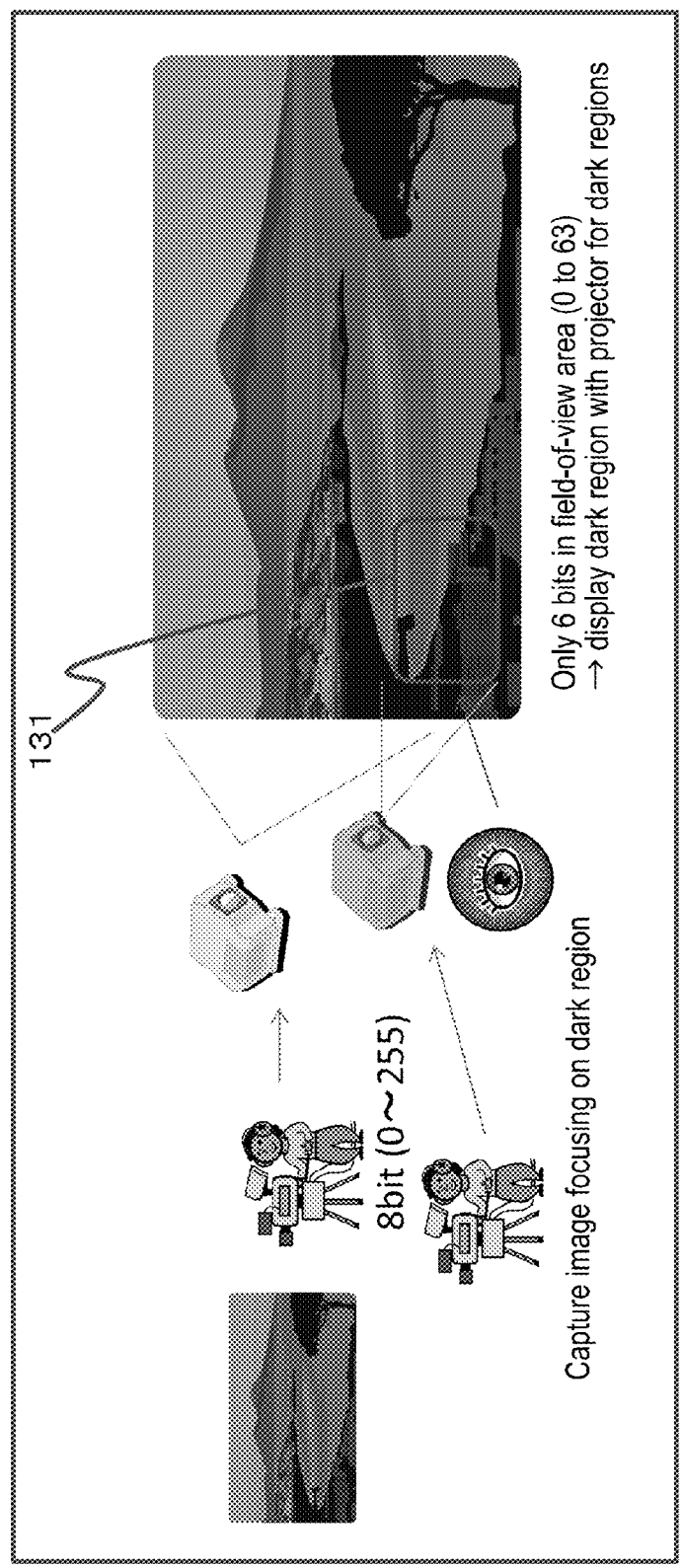
FIG. 12 is a diagram illustrating an example of specific processing by the image processing apparatus 1 in the embodiment.

In this example, the whole of the video A has 8-bit tones, and there are pixel values in almost all the range of 0 to 255. It is assumed that, in a case of viewing a dark portion in the video A, there are pixel values only in a range of, for example, 0 to 63, in the field-of-view area (131 in FIG. 12). In this case, it can be said that, in the video A, the whole of the video has 8-bit tones (256 gradations), but this field-of-view area has only 6-bit tones (64 gradations).

Meanwhile, in the video B, the shutter speed is four times slower than that of the video A, and, thus, a pixel value distribution in the region corresponding to this field-of-view area is 0 to 255, that is, there are 8-bit tones. Note that, in the video B, there are many other portions having a pixel value of 255 due to overexposure.

The physical property information acquiring unit 14 associates one projector (hereinafter, referred to as a projector A) with the video A, and further associates the other projector with the video B. In this example, the physical property information is a relationship between brightnesses of the video A and the video B. That is to say, since the video B is captured at a shutter speed four times slower than that of the video A, a target with the same brightness is seen at the number of pixel values four times larger than that of the video A. In other words, the video B has to be reproduced at a brightness that is ¼ the brightness of the video A.

Next, the physical property processing unit 15 instructs the one projector to output the video A and the other projector to output the video B, according to the association made by the physical property information acquiring unit 14. The physical property processing unit 15 instructs the projector A to perform output at a light intensity of 4 and the projector B to perform output at a light intensity of 1, based on physical property information acquired by the physical property information acquiring unit 14.

Next, for example, the digital processing part 133 applies the restrictive condition stored in the restrictive condition storage part 131, to the video A and the video B, and judges whether or not the restrictive condition is satisfied. If the restrictive condition is not satisfied, the digital processing part 133 changes the video A and the video B such that the restrictive condition is satisfied. The restrictive condition is, for example, a condition that a relationship between pixels is maintained in the field-of-view area, a condition that a balance in the whole of an image of a wide area is maintained, or the like.

The relationship between pixels is, for example, that a difference between brightnesses of adjacent pixels is expressed as a difference in luminance, in a final output result (result obtained by overlapping light). The balance in the whole of an image is, for example, that a brightness distribution of the whole of an image is not so much different from that of the video A obtained by capturing images with correct exposure, in a final output result (result obtained by overlapping images).

Next, the one projector outputs the video A satisfying the restrictive condition, and the other projector outputs the video B satisfying the restrictive condition in an overlapping manner on the video A.

Accordingly, the user can always obtain sufficient tone information in the field-of-view area, and can obtain feeling similar to that when the user actually and directly views the target. As a result, reactions such as movement of the eyes and movement of the face become similar to those when the user actually and directly views the target.

Above, a description was given assuming that pixel values of cameras and projectors and output brightness are in a linear relationship, but this relationship is actually non-linear due to gamma characteristics and the like. Also in this case, processing as described above can be performed by modifying the pixel value—optical output characteristics with arithmetic expressions and LUTs.

Specific Example 4

Specific Example 4 will describe the image processing apparatus 1 that has a function of causing another sensor or the like to sense an image projected by a projector or the like, and adjusting the digital processing and the analog processing from a result thereof. The main processing in Specific Example 4 is processing after the digital processing and the analog processing are performed, and may be performed following the processing in Specific Examples 1 to 3 described above.

The output image information acquiring unit 17 acquires a measurement result of a projected result of a projector. The measurement result is an example of after-processing information. The measurement result is, for example, information relating to luminance (information for specifying a light region, and information for specifying a dark region), whether or not the luminance is non-uniform, information indicating a region in which the luminance is non-uniform, a degree of focusing, a time response (flicker, reaction speed), or the like.

Next, the image analysis unit 12 acquires, for each spatiotemporal block, a first feature amount vector containing the after-processing information. Referring to the LUT, the image analysis unit 12 selects association information having a second feature amount vector that is the closest to the first feature amount vector.

Next, the digital processing unit 13 performs image processing on each spatiotemporal block using the selected association information, thereby acquiring a processed image for each spatiotemporal block.

Next, the physical property information acquiring unit 14 acquires physical property information regarding a lost physical property of the processed image subjected to the digital processing.

Next, the physical property processing unit 15 performs physical property processing, using the processed image, according to the physical property information. The output unit 16 outputs the processed image subjected to the physical property processing.

With the above-described processing, an image that can reproduce physical properties in the real world can be output. Note that, in Specific Example 4, parameters in the digital processing are adjusted using an LUT such that physical properties in the real world can be reproduced.

Furthermore, even in the case where an image optimized by the analog processing is output, actually projected light may not be as expected due to the influence of disturbance (e.g., outside light, temperature and humidity, etc.). Thus, in Specific Example 4, the state of the actually projected light is sensed, and the digital processing and the analog processing are changed such that the image is output as originally expected. It is possible to sense the projected image as needed during image output, or to keep using the environmental information sensed before image output.

Specific Example 5

Specific Example 5 will describe the image processing apparatus 1 that has a function of sensing a viewer reaction, and adjusting the digital processing and the analog processing from a result thereof.

The user information acquiring unit 19 acquires user information indicating a viewer reaction. The user information is, for example, information indicating an eye movement, information indicating a pupillary response, information indicating a posture change, brain wave information, or the like.

Next, the image analysis unit 12 acquires, for each spatiotemporal block, a first feature amount vector containing the user information. Referring to the LUT, the image analysis unit 12 selects association information having a second feature amount vector that is the closest to the first feature amount vector.

Next, the digital processing unit 13 performs image processing on each spatiotemporal block using the selected association information, thereby acquiring a processed image for each spatiotemporal block.

Next, the physical property information acquiring unit 14 acquires physical property information regarding a lost physical property of the image accepted by the image accepting unit 11.

Next, the physical property processing unit 15 performs physical property processing indicated by the physical property information, using the processed image. The output unit 16 outputs the processed image subjected to the physical property processing.

With the above-described processing, an image that can reproduce physical properties in the real world can be output. Note that, in Specific Example 5, parameters in the digital processing and the analog processing are acquired using an LUT such that physical properties in the real world can be reproduced.

In Specific Example 5, a difference in viewer reaction when projecting video is detected, and the digital processing and the analog processing are changed so as to make the reaction closer to a targeted viewer reaction. The targeted viewer reaction can be acquired when acquiring video, from reactions of people that are present on site of video acquisition, or can be estimated from video information or the like, using a database (LUT) of previously accumulated reactions of people. The database of previously accumulated reactions of people is, for example, a database of reactions of people induced by a content, a type, a size, a brightness, or the like of an image, more specifically, a database of enlargement or reduction in the size of the pupils due to brightness, movement of a direction of the eyes due to the distance or the number of objects contained in an image, or other reactions of people induced by movement contained in an image.

As described above, according to this embodiment, it is possible to reproduce lost physical properties of a target expressed in an image, to the fullest extent possible.

The processing in this embodiment may be realized using software. The software may be distributed by software download or the like. Furthermore, the software may be distributed in a form where the software is stored in a storage medium such as a CD-ROM. Note that the same is applied to other embodiments described in this specification. The software that realizes the image processing apparatus in this embodiment may be the following sort of program. Specifically, this program is a program for causing a computer to function as: an image accepting unit that accepts one or at least two images; a digital processing unit that performs digital processing on the one or at least two images accepted by the image accepting unit, thereby acquiring one or at least two processed images; a physical property information acquiring unit that acquires physical property information, which is information relating to a physical property that has been lost compared with one or more physical properties of a target contained in the one or at least two images accepted by the image accepting unit; a physical property processing unit that performs physical property processing, which is processing for adding a physical property corresponding to the physical property information, using the one or at least two processed images; and an output unit that outputs a processed image subjected to the physical property processing.

Furthermore, in this program, it is preferable that the computer is caused to function such that the digital processing unit performs digital processing on the one or at least two images accepted by the image accepting unit, using after-processing information, which is information obtained after the physical property processing unit performs the physical property processing, thereby acquiring one or at least two processed images.

Furthermore, in this program, it is preferable that the computer is caused to function such that the digital processing unit performs digital processing on the one or at least two images accepted by the image accepting unit, using the physical property information, thereby acquiring one or at least two processed images.

Furthermore, in this program, it is preferable that the computer is caused to function such that the physical property information acquiring unit acquires physical property information, using the one or at least two images accepted by the image accepting unit or the one or at least two processed images.

Furthermore, in this program, it is preferable that the computer is caused to function such that a look-up table having one or at least two pieces of association information, which is information for associating the whole or part of one or at least two images with the whole or part of processed images that are images of the same target as the images, and is information including information for acquiring physical property information, is stored, the digital processing unit acquires the whole or part of one or at least two processed images associated with the whole or part of the one or more images accepted by the image accepting unit, using one piece of association information of the one or at least two pieces of association information, and the physical property information acquiring unit acquires physical property information, using one piece of association information of the one or at least two pieces of association information.

Furthermore, in this program, it is preferable that the computer is caused to function such that two or more look-up tables each having one or at least two pieces of association information, which is information for associating the whole or part of one or at least two images with the whole or part of processed images that are images of the same target as the images, and is information including information for acquiring physical property information, are stored, the digital processing unit acquires the whole or part of one or at least two processed images associated with the whole or part of the one or more images accepted by the image accepting unit, using one piece of association information of the pieces of association information in one look-up table of the two or more look-up tables, and the physical property information acquiring unit acquires physical property information, using one piece of association information of the pieces of association information in one look-up table of the two or more look-up tables.

Furthermore, in this program, it is preferable that the computer is caused to function such that an image analysis unit that analyzes the whole or part of the one or more images accepted by the image accepting unit, thereby acquiring an analysis result, and selects association information corresponding to the analysis result is further included, the digital processing unit acquires the whole or part of one or at least two processed images associated with the whole or part of the one or more images accepted by the image accepting unit, using the association information selected by the image analysis unit, and the physical property information acquiring unit acquires physical property information, using the association information selected by the image analysis unit.

Furthermore, in this program, it is preferable that the computer is caused to function such that, in a case where the one or at least two processed images are to be optically output, the physical property processing unit performs control for optical output, according to the physical property information, and the output unit outputs one or at least two processed images subjected to the control for optical output, based on the control for optical output performed by the physical property processing unit.

Furthermore, in this program, it is preferable that the computer is caused to function such that the physical property information is information relating to a light intensity, the physical property processing unit sets a light intensity in a case where optical output is to be performed, according to the physical property information, and the output unit outputs the one or at least two processed images, according to the set light intensity.

Furthermore, in this program, it is preferable that the computer is caused to function such that the physical property information is information relating to a field-of-view angle, the physical property processing unit sets a field-of-view angle, according to the physical property information, and the output unit outputs the one or at least two processed images, according to the set field-of-view angle.

Furthermore, in this program, it is preferable that the computer is caused to function such that multiple output units are included, the physical property information acquiring unit acquires physical property information, which is information for controlling optical output of the multiple output units, and the physical property processing unit performs control for optical output of the multiple output units, according to the physical property information.

Furthermore, in this program, it is preferable that the computer is caused to function such that an output image information acquiring unit that acquires output image information, which is information relating to the one or at least two processed images output by the output unit is further included, and the after-processing information is the output image information.

Further, in this program, it is preferable that the computer is caused to function such that a user information acquiring unit that acquires user information, which is information relating to a user viewing the processed images is further included, and the after-processing information is the user information.

Embodiment 2

This embodiment will describe an image processing apparatus that, in a case of accepting an image, also accepts physical property information associated with the image. That is to say, the processing by the image processing apparatus in this embodiment is different from the image processing apparatus 1 of Embodiment 1 only in the physical property information acquiring method.

Figure 13:
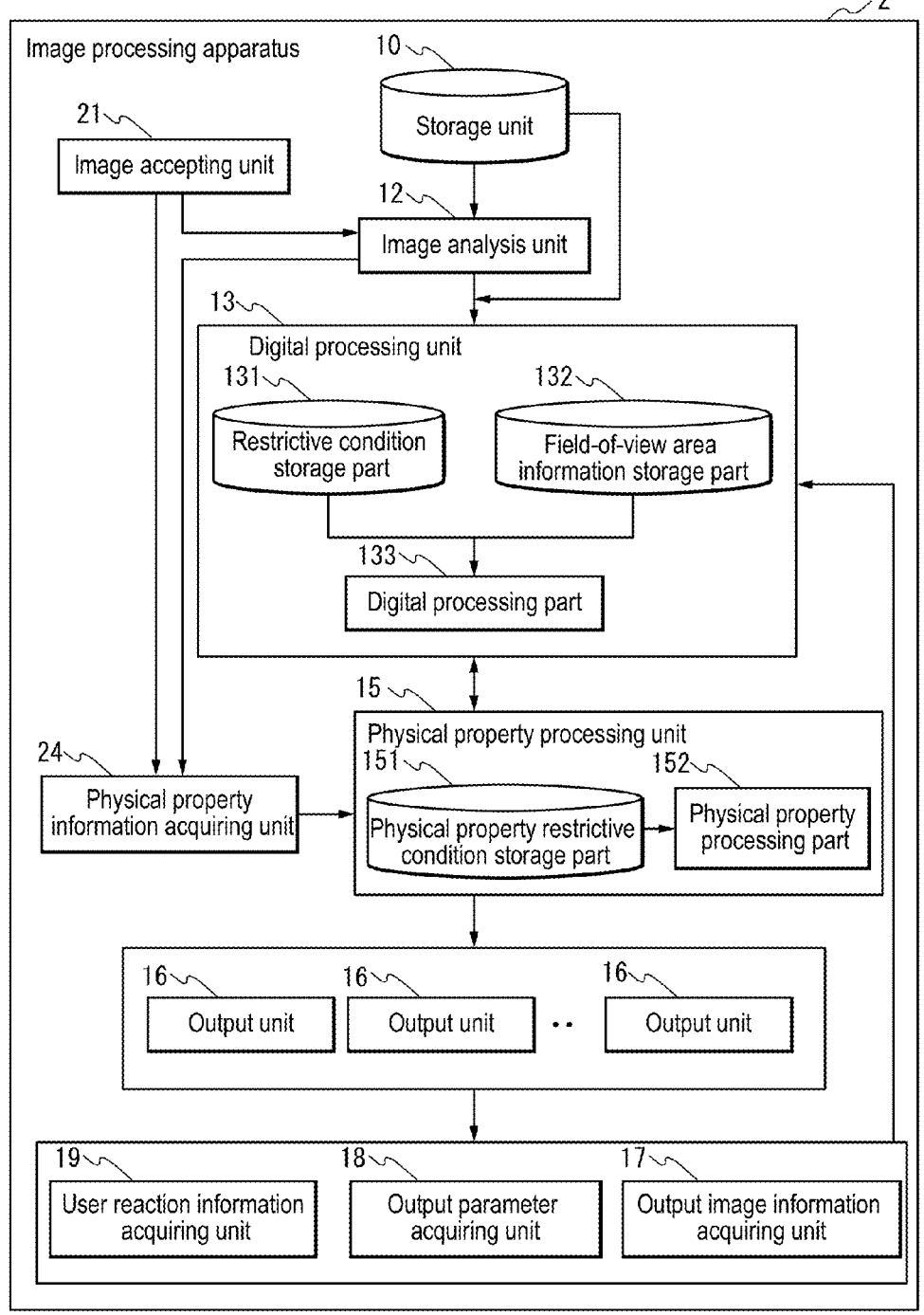
FIG. 13 is a block diagram of an image processing apparatus 2 in Embodiment 2.

FIG. 13 is a block diagram of an image processing apparatus 2 in this embodiment. The image processing apparatus 2 includes an image accepting unit 21, the image analysis unit 12, the digital processing unit 13, a physical property information acquiring unit 24, the physical property processing unit 15, the output units 16, the output image information acquiring unit 17, the output parameter acquiring unit 18, and the user information acquiring unit 19.

The image accepting unit 21 accepts one or at least two images. The image accepting unit 21 also accepts physical property information associated with the one or at least two images. Furthermore, the image accepting unit 21 may accept two or more types of images obtained by capturing images of one target in different environments. The physical property information accepted by the image accepting unit 21 is, for example, information input on site of image capture. The physical property information accepted by the image accepting unit 21 is, for example, information automatically acquired on site of image capture. The accepting is typically receiving using a communication part or a broadcast receiving part, but is a concept that encompasses accepting information read from a storage medium such as an optical disk, a magnetic disk, or a semiconductor memory, and accepting an image input from an input device such as a scanner or a camera. The image accepting unit 21 may be realized by, for example, a broadcast receiving part, a communication part, or the like.

The physical property information acquiring unit 24 acquires physical property information accepted by the image accepting unit 21. The physical property information acquired by the physical property information acquiring unit 24 is the same as the physical property information acquired by the physical property information acquiring unit 14. The physical property information acquiring unit 24 may be realized typically by an MPU, a memory, or the like. Typically, the processing procedure of the physical property information acquiring unit 24 is realized by software, and the software is stored in a storage medium such as a ROM. Note that the processing procedure may be realized also by hardware (a dedicated circuit).

Next, an example of an operation of the image processing apparatus 2 will be described with reference to the flowchart in FIG. 14. In the flowchart in FIG. 14, a description of the same steps as those in the flowchart in FIG. 2 has been omitted.

(Step S1501) The image accepting unit 11 judges whether or not one or more images and physical property information have been accepted. If one or more images and the like have been accepted, the procedure advances to step S202, and, if not, the procedure returns to step S201.

(Step S1502) The physical property information acquiring unit 14 acquires physical property information, from the information accepted in step S1501.

Figure 14:
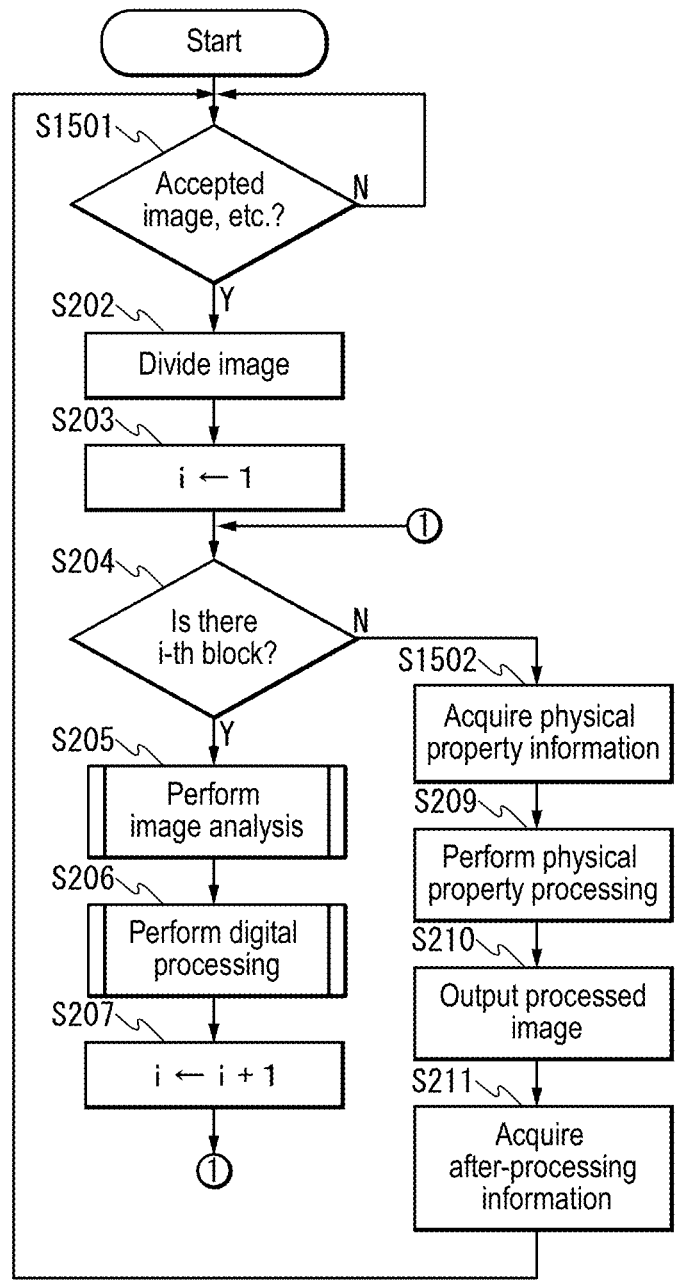
FIG. 14 is a flowchart illustrating an operation of the image processing apparatus 2 in the embodiment.

Note that, in the flowchart in FIG. 14, the image dividing processing is performed in step S202, but the image dividing processing does not have to be performed. In this case, the number of blocks is one.

Furthermore, in the flowchart in FIG. 14, the physical property information acquiring processing and the physical property processing in steps S1502 and S209 are performed in units of images and the like accepted by the image accepting unit 21, but they may be performed in units of spatiotemporal blocks obtained by division.

Furthermore, in the flowchart in FIG. 14, the physical property processing is performed after the digital processing. However, the digital processing may be performed after the physical property processing, or the digital processing and the physical property processing may be performed in parallel.

Note that the procedure is terminated by powering off or an interruption at completion of the process in the flowchart in FIG. 14.

As described above, according to this embodiment, it is possible to reproduce lost physical properties of a target expressed in an image, to the fullest extent possible.

Note that the software that realizes the image processing apparatus in this embodiment may be the following sort of program. Specifically, this program is a program for causing a computer to function as: an image accepting unit that accepts one or at least two images; a digital processing unit that performs digital processing on the one or at least two images accepted by the image accepting unit, thereby acquiring one or at least two processed images; a physical property information acquiring unit that acquires physical property information, which is information relating to a physical property that has been lost compared with one or more physical properties of a target contained in the one or at least two images accepted by the image accepting unit; a physical property processing unit that performs physical property processing, which is processing for adding a physical property corresponding to the physical property information, using the one or at least two processed images; and an output unit that outputs a processed image subjected to the physical property processing.

Furthermore, in this program, it is preferable that the computer is caused to function such that the image accepting unit also accepts physical property information associated with the one or at least two images, and the physical property information acquiring unit acquires physical property information associated with the one or at least two images.

Embodiment 3

This embodiment will describe an image processing apparatus that acquires physical property information input from a viewer, and performs image processing using the physical property information. That is to say, the processing by the image processing apparatus in this embodiment is different from the image processing apparatus 1 of Embodiment 1 and the image processing apparatus 2 of Embodiment 2 only in the physical property information acquiring method.

Figure 15:
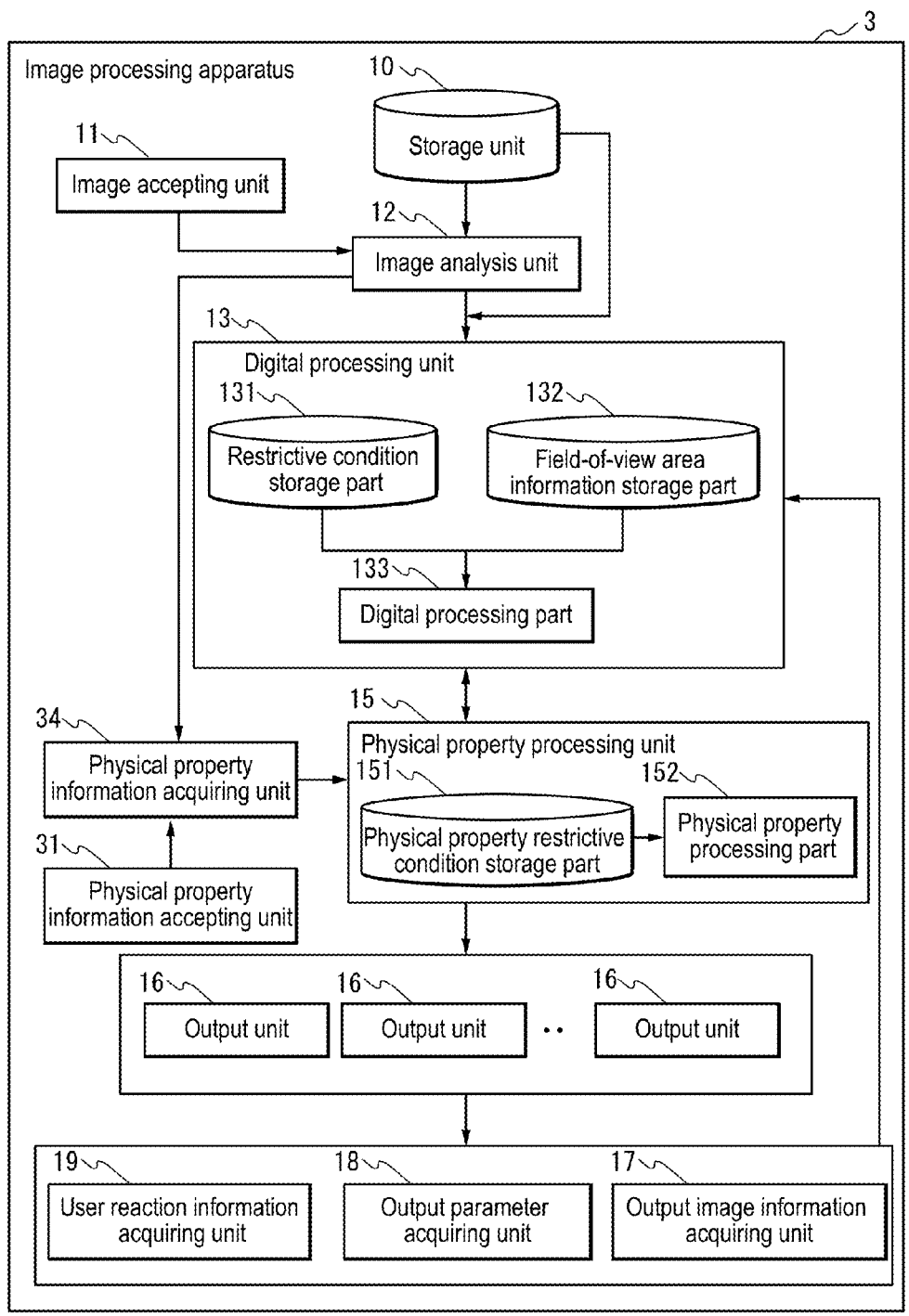
FIG. 15 is a block diagram of an image processing apparatus 3 in Embodiment 3.

FIG. 15 is a block diagram of an image processing apparatus 3 in this embodiment. The image processing apparatus 3 includes the image accepting unit 11, a physical property information accepting unit 31, the image analysis unit 12, the digital processing unit 13, a physical property information acquiring unit 34, the physical property processing unit 15, the output units 16, the output image information acquiring unit 17, the output parameter acquiring unit 18, and the user information acquiring unit 19.

The physical property information accepting unit 31 accepts physical property information input by a viewer of an image. The physical property information is, for example, a size (e.g., "1 m", etc.) of a subject in an image, a brightness (e.g., "1000 1x", etc.) of a subject in an image, or the like. The physical property information may be input by any part such as a keyboard, a mouse, a menu screen, or the like. The physical property information accepting unit 31 may be realized by a device driver for an input part such as a keyboard or the like, control software for a menu screen, or the like.

The physical property information acquiring unit 34 acquires physical property information accepted by the physical property information accepting unit 31. The physical property information acquired by the physical property information acquiring unit 34 is the same as the physical property information acquired by the physical property information acquiring unit 14 and the physical property information acquiring unit 24. The physical property information acquiring unit 34 may be realized typically by an MPU, a memory, or the like. Typically, the processing procedure of the physical property information acquiring unit 34 is realized by software, and the software is stored in a storage medium such as a ROM. Note that the processing procedure may be realized also by hardware (a dedicated circuit).

Next, an operation of the image processing apparatus 3 will be described with reference to the flowchart in FIG. 16. In the flowchart in FIG. 16, a description of the same steps as those in the flowchart in FIG. 2 has been omitted.

(Step S1701) The physical property information accepting unit 31 judges whether or not physical property information has been accepted. If physical property information has been accepted, the procedure advances to step S208, and, if not, the procedure advances to step S210. If the physical property information is not accepted in step S210 in FIG. 16, the processed image output by the output unit 16 is a processed image subjected only to the digital processing.

Figure 16:
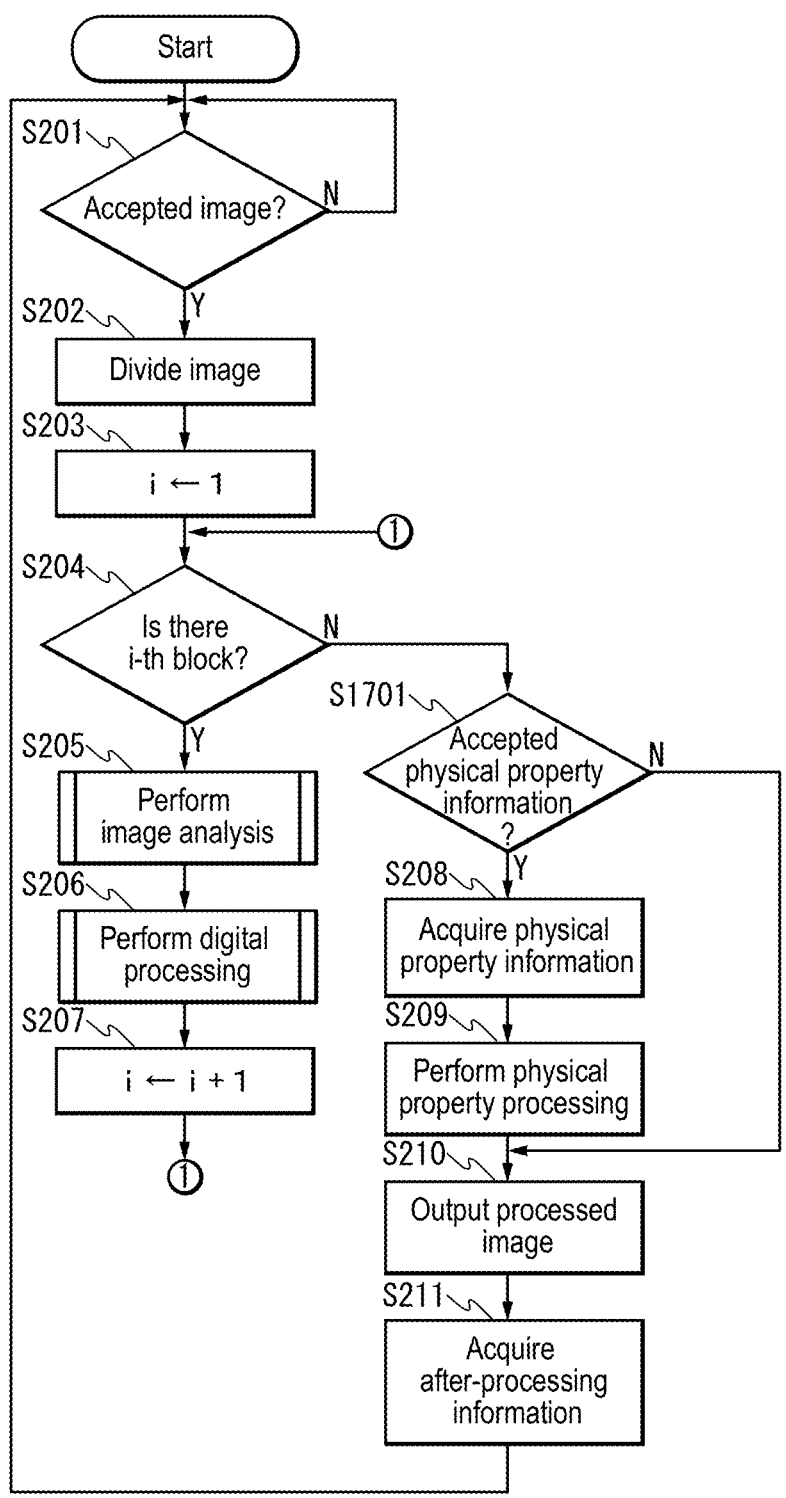
FIG. 16 is a flowchart illustrating an operation of the image processing apparatus 3 in the embodiment.

Note that, in the flowchart in FIG. 16, the image dividing processing is performed in step S202, but the image dividing processing does not have to be performed. In this case, the number of blocks is one.

Furthermore, in the flowchart in FIG. 16, the physical property processing is performed after the digital processing. However, the digital processing may be performed after the physical property processing, or the digital processing and the physical property processing may be performed in parallel.

Note that the procedure is terminated by powering off or an interruption at completion of the process in the flowchart in FIG. 16.

Hereinafter, a specific operation of the image processing apparatus 3 in this embodiment will be described. In this specific example, a case will be described in which a viewer views an image, estimates a physical property in the real world, and inputs physical property information to the image processing apparatus 3. The physical property information is, for example, an instruction of a size (e.g., "1 m", etc.) of a subject in an image, or the like.

The physical property information accepting unit 31 accepts physical property information input by a viewer of an image. The physical property information acquiring unit 34 acquires physical property information accepted by the physical property information accepting unit 31. The physical property processing unit 15 performs analog processing, according to the physical property information acquired by the physical property information acquiring unit 34. The analog processing is, for example, processing that instructs a projector to increase a light intensity of the projector, processing that instructs a projector to increase a size of an image projected by the projector (to perform zoom-in operation), or the like.

Furthermore, the digital processing unit 13 converts an image that comes not to satisfy the restrictive condition, due to the analog processing, thereby acquiring a processed image that satisfies the restrictive condition.

Next, the output units 16 (projectors) output the processed image subjected to the digital processing so as to satisfy the restrictive condition, according to an instruction from the physical property processing unit 15.

As described above, according to this embodiment, it is possible to reproduce lost physical properties of a target expressed in an image, to the fullest extent possible.

Furthermore, according to this embodiment, it is possible to obtain an image according to the physical properties that are on the mind of the viewer.

Note that the software that realizes the image processing apparatus in this embodiment may be the following sort of program. Specifically, this program is a program for causing a computer to function as: an image accepting unit that accepts one or at least two images; a digital processing unit that performs digital processing on the one or at least two images accepted by the image accepting unit, thereby acquiring one or at least two processed images; a physical property information acquiring unit that acquires physical property information, which is information relating to a physical property that has been lost compared with one or more physical properties of a target contained in the one or at least two images accepted by the image accepting unit; a physical property processing unit that performs physical property processing, which is processing for adding a physical property corresponding to the physical property information, using the one or at least two processed images; and an output unit that outputs a processed image subjected to the physical property processing.

Furthermore, in this program, it is preferable that the computer is caused to further function as a physical property information accepting unit that accepts physical property information, wherein the physical property information acquiring unit acquires physical property information accepted by the physical property information accepting unit.

Figure 17:
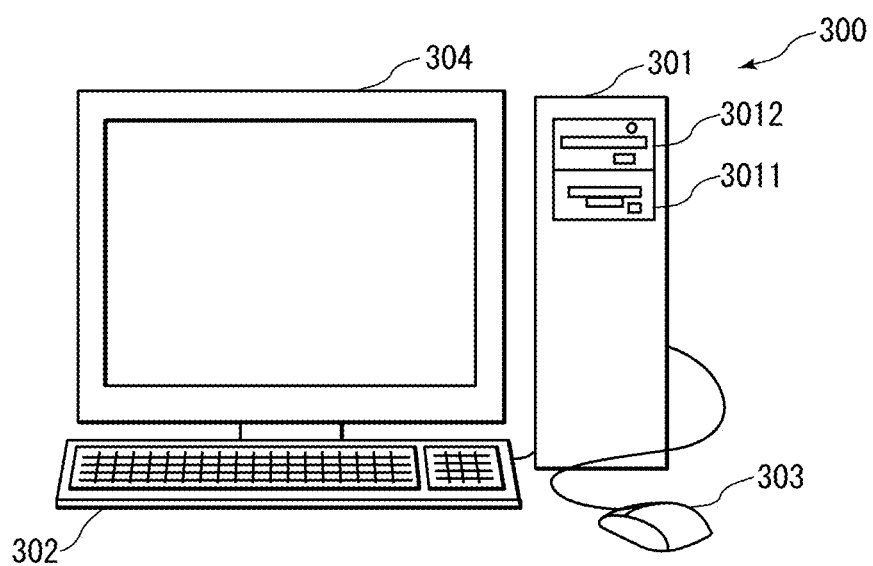
FIG. 17 is a schematic view of a computer system in the foregoing embodiments.
Figure 18:
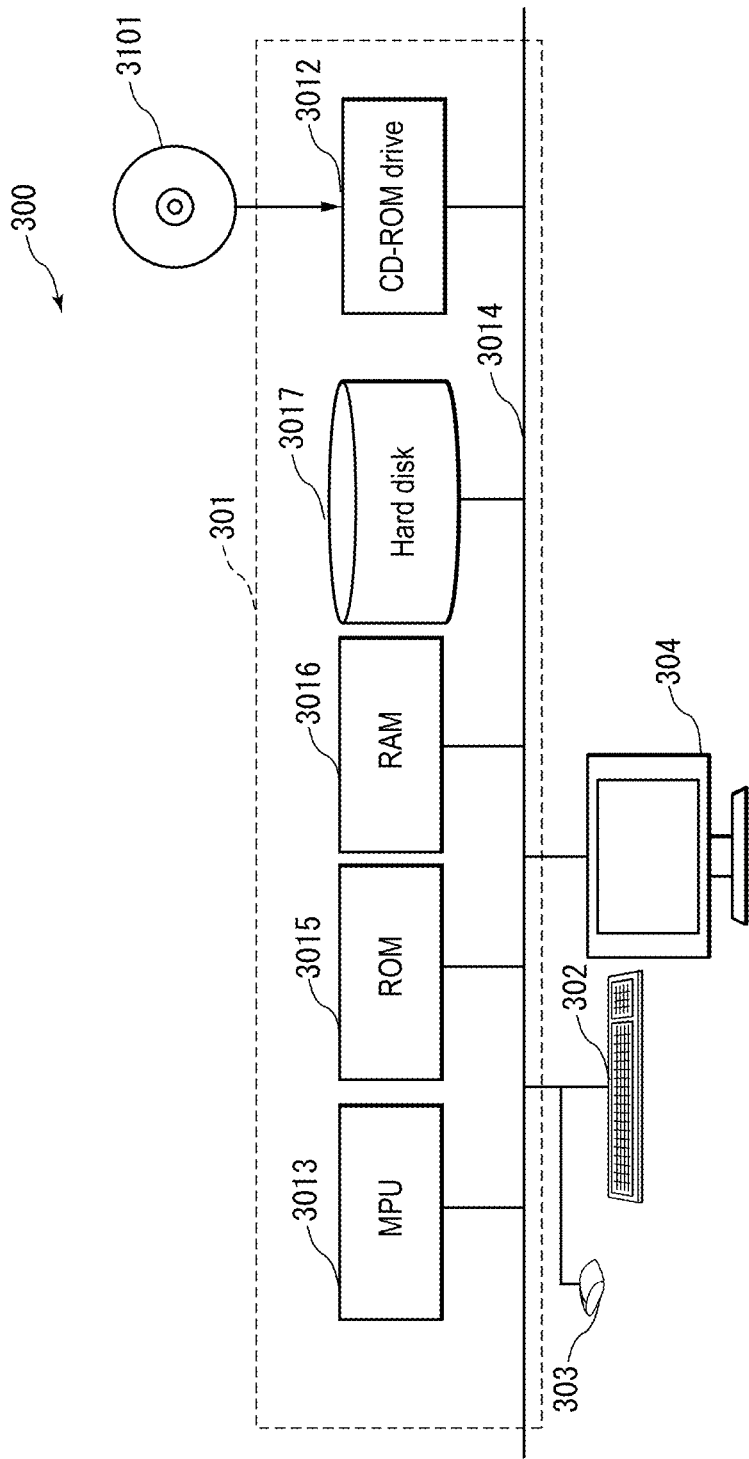
FIG. 18 is a block diagram of the computer system in the embodiments.

FIG. 17 shows the external appearance of a computer that executes the programs described in this specification to realize the image processing apparatus in the foregoing various embodiments. The foregoing embodiments may be realized using computer hardware and a computer program executed thereon. FIG. 17 is a schematic view of a computer system 300. FIG. 18 is a block diagram of the computer system 300.

In FIG. 17, the computer system 300 includes a computer 301 including a CD-ROM drive, a keyboard 302, a mouse 303, and a monitor 304.

In FIG. 18, the computer 301 includes not only the CD-ROM drive 3012, but also an MPU 3013, a bus 3014, a ROM 3015, a RAM 3016, and a hard disk 3017. The bus 3014 is connected to the MPU 3013 and the CD-ROM drive 3012. In the ROM 3015, a program such as a boot up program is stored. The RAM 3016 is connected to the MPU 3013, and is a memory in which a command of an application program is temporarily stored and a temporary storage area is to be provided. In the hard disk 3017, an application program, a system program, and data are to be stored. Although not shown, the computer 301 may further include a network card that provides connection to a LAN.

The program for causing the computer system 300 to execute the functions of the image processing apparatus in the foregoing embodiments may be stored in a CD-ROM 3101 that is inserted into the CD-ROM drive 3012, and be transmitted to the hard disk 3017. Alternatively, the program may be transmitted via a network (not shown) to the computer 301 and stored in the hard disk 3017. At the time of execution, the program is loaded into the RAM 3016. The program may be loaded from the CD-ROM 3101, or directly from a network.

The program does not necessarily have to include, for example, an operating system or a third party program to cause the computer 301 to execute the functions of the image processing apparatus in the foregoing embodiments. The program may only include a command portion to call an appropriate function (module) in a controlled mode and obtain the desired results. The manner in which the computer system 300 operates is well known, and, thus, a detailed description thereof has been omitted.

It should be noted that, in the program, in a transmitting step of transmitting information, a receiving step of receiving information, or the like, processing that is performed by hardware, for example, processing performed by a modem or an interface card in the transmitting step (processing that can be performed only by hardware) is not included.

Furthermore, the computer that executes this program may be a single computer, or may be multiple computers. That is to say, centralized processing may be performed, or distributed processing may be performed.

Furthermore, in the foregoing embodiments, it will be appreciated that two or more communication parts in one apparatus may be physically realized by one medium.

Furthermore, in the foregoing embodiments, each processing (each function) may be realized as centralized processing using a single apparatus (system), or may be realized as distributed processing using multiple apparatuses.

It will be appreciated that the present invention is not limited to the embodiments set forth herein, and various modifications are possible within the scope of the present invention.

INDUSTRIAL APPLICABILITY

As described above, the image processing apparatus according to the present invention has an effect that this apparatus can reproduce lost physical properties of a target expressed in an image, to the fullest extent possible, and, thus, this apparatus is useful as a television apparatus and the like.

LIST OF REFERENCE NUMERALS 1, 2, 3 Image processing apparatus
10 Storage unit
11, 21 Image accepting unit
12 Image analysis unit
13 Digital processing unit
14, 24, 34 Physical property information acquiring unit
14 Property information acquiring unit
15 Physical property processing unit
16 Output unit
17 Output image information acquiring unit
18 Output parameter acquiring unit
19 User information acquiring unit
31 Physical property information accepting unit
131 Restrictive condition storage part
132 Field-of-view area information storage part
133 Digital processing part
151 Physical property restrictive condition storage part
152 Physical property processing part

The invention claimed is:

1. An image processing apparatus, comprising:
an image accepting unit that accepts one or at least two images;
a digital processing unit that performs digital processing on the accepted one or at least two images, thereby generating one or at least two processed images;
a physical property information acquiring unit that acquires physical property information, which is information relating to a physical property that has been lost from the accepted one or at least two images during the digital processing, the physical property information including at least one of a size of a target contained in the accepted one or at least two images, information relating to a display screen area corresponding to a size of the target, light intensity of the accepted one or at least two images, a field-of-view angle of the accepted one or at least two images and one or more optical output control parameters for controlling optical output;
a physical property processing unit that performs physical property processing, which is processing for modifying a physical property of the one or at least two processed images, corresponding to the acquired physical property information; and
an output unit that outputs an output image, which is a processed image subjected to the physical property processing performed by the physical property processing unit, wherein:
the physical property processing performs one or more processes of setting a size of the output image based on the acquired size of the target, setting information relating to a display screen area based on the acquired information relating to the display screen area, setting light intensity based on the acquired light intensity, setting a field-of-view angle based on the acquired field-of-view angle, and setting one or more optical output control parameters based on the acquired one or more optical output control parameters, thereby determining one or more control parameters, and
the output unit outputs the output image by using the one or more control parameters determined by the physical property processing unit.

2. The image processing apparatus according to claim 1, wherein the digital processing unit performs digital processing on the accepted one or at least two images, using after-processing information, which is information obtained after the physical property processing unit performs the physical property processing, thereby generating the one or at least two processed images.

3. The image processing apparatus according to claim 1, wherein the digital processing unit performs digital processing on the accepted one or at least two images, using the physical property information, thereby generating the one or at least two processed images.

4. The image processing apparatus according to claim 1, wherein the physical property information acquiring unit acquires the physical property information, using at least one of the accepted one or at least two images or the one or at least two processed images.

5. The image processing apparatus according to claim 1, further comprising:
a storage unit configured to store a look-up table having one or at least two pieces of association information, which is information for associating the whole or part of one or at least two images with the whole or part of processed images that are images of a same target as the images, and is information including information for acquiring physical property information;
wherein the digital processing unit generates the whole or part of one or at least two processed images associated with the whole or part of the one or more images accepted by the image accepting unit, using one piece of association information of the one or at least two pieces of association information, and
the physical property information acquiring unit acquires the physical property information, using one piece of association information of the one or at least two pieces of association information.

6. The image processing apparatus according to claim 1, further comprising:
a storage unit configured to store two or more look-up tables each having one or at least two pieces of association information, which is information for associating the whole or part of one or at least two images with the whole or part of processed images that are images of the same target as the images, and is information including information for acquiring physical property information;
wherein the digital processing unit generates the whole or part of one or at least two processed images associated with the whole or part of the one or more images accepted by the image accepting unit, using one piece of association information of the pieces of association information in one look-up table of the two or more look-up tables, and the physical property information acquiring unit acquires the physical property information, using one piece of association information of the pieces of association information in one look-up table of the two or more look-up tables.

7. The image processing apparatus according to claim 5, further comprising:

an image analysis unit that analyzes the whole or part of the accepted one or more images, thereby acquiring an analysis result, and selects association information corresponding to the analysis result;

wherein the digital processing unit generates the whole or part of one or at least two processed images associated with the whole or part of the accepted one or more images, using the association information selected by the image analysis unit, and the physical property information acquiring unit acquires the physical property information, using the association information selected by the image analysis unit.

8. The image processing apparatus according to claim 1, wherein the image accepting unit also accepts physical property information associated with the one or at least two images, and the physical property information acquiring unit acquires the acquired physical property information associated with the one or at least two images.

9. The image processing apparatus according to claim 1, further comprising:

a physical property information accepting unit that accepts physical property information;

wherein the physical property information acquiring unit acquires the accepted physical property information accepted by the physical property information accepting unit.

10. The image processing apparatus according to claim 1, wherein, in a case where the one or at least two processed images are to be optically output, the physical property processing unit determines the one or more optical output control parameters for optical output, according to the physical property information, and the output unit outputs one or at least two processed images subjected to the control for optical output, based on the determined one or more optical output control parameters.

11. The image processing apparatus according to claim 10, wherein the physical property information is information relating to a light intensity, the physical property processing unit sets the light intensity in a case where optical output is to be performed, according to the physical property information, and the output unit outputs the one or at least two processed images, according to the set light intensity.

12. The image processing apparatus according to claim 10, wherein the physical property information includes the field-of-view angle, the physical property processing unit sets the field-of-view angle, according to the physical property information, and the output unit outputs the one or at least two processed images, according to the set field-of-view angle.

13. The image processing apparatus according to claim 10, wherein the image processing apparatus includes multiple output units, the physical property information acquiring unit acquires physical property information, which includes one or more optical output control parameters for controlling optical output of the multiple output units, and the physical property processing unit performs control for optical output of the multiple output units, according to the physical property information.

14. The image processing apparatus according to claim 2, further comprising:

an output image information acquiring unit that acquires output image information, which is information relating to the one or at least two processed images output by the output unit;

wherein the after-processing information is the output image information.

15. The image processing apparatus according to claim 2, further comprising:

a user information acquiring unit that acquires user information, which is information relating to a user viewing the processed images;

wherein the after-processing information is the user information.

16. The image processing apparatus according to claim 2, wherein the after-processing information is information relating to a display screen area, and the digital processing unit performs processing that adjusts a spatiotemporal luminance activity according to the display screen area, on the one or at least two images accepted by the image accepting unit.

17. The image processing apparatus according to claim 1, wherein the digital processing unit includes:

a restrictive condition storage part configured to store one or more restrictive conditions regarding a pixel contained in an image; and a digital processing part that changes a pixel contained in the one or at least two images accepted by the image accepting unit such that the one or more restrictive conditions are satisfied by the one or at least two images, thereby acquiring one or at least two processed images.

18. The image processing apparatus according to claim 1, wherein the physical property processing unit includes:

a physical property restrictive condition storage part configured to store one or more restrictive conditions regarding the physical property information; and a physical property processing part that changes the physical property information such that the one or more restrictive conditions are satisfied by one or at least two images that are to be output by the output unit, thereby acquiring one or at least two processed images.

19. The image processing apparatus according to claim 1, wherein the output unit includes:

an output restrictive condition storage part configured to store one or more restrictive conditions regarding output; and an output part that changes the one or at least two processed images such that the one or more restrictive conditions are satisfied by one or at least two images that are to be output, and outputs the changed one or at least two processed images.

20. The image processing apparatus according to claim 1, wherein the physical property information acquiring unit acquires information relating to the display screen area corresponding to the size of the target contained in the accepted one or at least two images, the physical property processing unit sets the information relating to the display screen area, and the output unit outputs the one or at least two processed images, according to the set information relating to the display screen area.

21. The image processing apparatus according to claim 1, wherein the image processing apparatus includes multiple output units having different resolutions, the physical property information acquiring unit acquires, for each of the multiple output units, portion specifying information for specifying a partial image, which is an image of a portion forming the processed image, and is an image output by that output unit, and each of the multiple output units outputs a partial image specified with the corresponding portion specifying information.

22. The image processing apparatus according to claim 1, wherein the image processing apparatus includes multiple output units, the image accepting unit accepts two or more types of images obtained by capturing images of one target in different environments, the digital processing unit performs digital processing on the accepted two or more types of images, thereby generating two or more types of processed images, the physical property information acquiring unit acquires physical property information, which is information for specifying the whole or part of the two or more types of processed images, and the physical property processing unit instructs the multiple output units to output the whole or part of two or more processed images in an overlapping manner, according to the physical property information.

23. An image processing method, realized by using an image accepting unit, a digital processing unit, a physical property information acquiring unit, a physical property processing unit, and an output unit, the image processing method comprising:

accepting, by the image accepting unit, one or at least two images;

performing a digital processing, by the digital processing unit, on the accepted one or at least two, thereby generating one or at least two processed images;

acquiring, by the physical property information acquiring unit, physical property information, which is information relating to a physical property that has been lost from the accepted one or at least two images during the digital processing, the physical property information including at least one of a size of a target contained in the accepted one or at least two images, information relating to a display screen area corresponding to a size of the target, light intensity of the accepted one or at least two images, a field-of-view angle of the accepted one or at least two images and one or more optical output control parameters for controlling optical output;

performing physical property processing, by the physical property processing unit, which is processing for modifying a physical property of the one or at least two processed images, corresponding to the acquired physical property information; and outputting, by the output unit, an output image, which is a processed image subjected to the physical property processing wherein:

in the physical property processing, one or more processes of setting a size of the output image based on the acquired size of the target, setting information relating to a display screen area based on the acquired information relating to the display screen area, setting light intensity based on the acquired light intensity, setting a field-of-view angle based on the acquired field-of-view angle, and setting one or more optical output control parameters based on the acquired one or more optical output control parameters, are performed, thereby determining one or more control parameters, and in the outputting, the output image is output by using the one or more control parameters determined by the physical property processing unit.

24. A non-transitory storage medium in which a program is stored, the program, when executed by a computer, causing the computer to function as:

an image accepting unit that accepts one or at least two images;

a digital processing unit that performs digital processing on the accepted one or at least two images, thereby generating one or at least two processed images;

a physical property information acquiring unit that acquires physical property information, which is information relating to a physical property that has been lost from the accepted one or at least two images during the digital processing, the physical property information including at least one of a size of a target contained in the accepted one or at least two images, information relating to a display screen area corresponding to a size of the target, light intensity of the accepted one or at least two images, a field-of-view angle of the accepted one or at least two images and one or more optical output control parameters for controlling optical output;

a physical property processing unit that performs physical property processing, which is processing for modifying a physical property of the one or at least two processed images, corresponding to the acquired physical property information; and an output unit that outputs an output image, which is a processed image subjected to the physical property processing performed by the physical property processing unit, wherein:

the physical property processing performs one or more processes of setting a size of the output image based on the acquired size of the target, setting information relating to a display screen area based on the acquired information relating to the display screen area, setting light intensity based on the acquired light intensity, setting a field-of-view angle based on the acquired field-of-view angle, and setting one or more optical output control parameters based on the acquired one or more optical output control parameters, thereby determining one or more control parameters, and the output unit outputs the output image by using the one or more control parameters determined by the physical property processing unit.

25. An image processing apparatus, comprising:

an image accepting unit that accepts one or at least two images;

a digital processing unit that performs digital processing on the accepted one or at least two images, thereby generating one or at least two processed images;

a physical property information acquiring unit that acquires physical property information, which is information relating to a physical property that has been lost compared with one or more physical properties of a target contained in the accepted one or at least two images;

a physical property processing unit that performs physical property processing, which is processing for modifying a physical property corresponding to the physical property information, on the one or at least two processed images; and an output unit that outputs an output image, which is a processed image subjected to the physical property processing, wherein the digital processing unit includes:
  a restrictive condition storage part configured to store one or more restrictive conditions regarding a pixel contained in an image; and
  a digital processing part that changes a pixel contained in the one or at least two images accepted by the image accepting unit such that the one or more restrictive conditions are satisfied by the one or at least two images, thereby acquiring one or at least two processed images.

26. An image processing apparatus, comprising:
an image accepting unit that accepts one or at least two images;
a digital processing unit that performs digital processing on the accepted one or at least two images, thereby generating one or at least two processed images;
a physical property information acquiring unit that acquires physical property information, which is information relating to a physical property that has been lost compared with one or more physical properties of a target contained in the accepted one or at least two images;
a physical property processing unit that performs physical property processing, which is processing for modifying a physical property corresponding to the physical property information, on the one or at least two processed images; and
an output unit that outputs an output image, which is a processed image subjected to the physical property processing,
wherein the physical property processing unit includes:
  a physical property restrictive condition storage part configured to store one or more restrictive conditions regarding the physical property information; and
  a physical property processing part that changes the physical property information such that the one or more restrictive conditions are satisfied by one or at least two images that are to be output by the output unit, thereby acquiring one or at least two processed images.

27. An image processing apparatus, comprising:
an image accepting unit that accepts one or at least two images;
a digital processing unit that performs digital processing on the accepted one or at least two images, thereby generating one or at least two processed images;
a physical property information acquiring unit that acquires physical property information, which is information relating to a physical property that has been lost compared with one or more physical properties of a target contained in the accepted one or at least two images;

a physical property processing unit that performs physical property processing, which is processing for modifying a physical property corresponding to the physical property information, on the one or at least two processed images; and an output unit that outputs an output image, which is a processed image subjected to the physical property processing, wherein the output unit includes:
  an output restrictive condition storage part configured to store one or more restrictive conditions regarding output; and
  an output part that changes the one or at least two processed images such that the one or more restrictive conditions are satisfied by one or at least two images that are to be output, and outputs the changed one or at least two processed images.

28. An image processing apparatus, comprising:
an image accepting unit that accepts one or at least two images;
a digital processing unit that performs digital processing on the accepted one or at least two images, thereby generating one or at least two processed images;
a physical property information acquiring unit that acquires physical property information, which is information relating to a physical property that has been lost compared with one or more physical properties of a target contained in the accepted one or at least two images;
a physical property processing unit that performs physical property processing, which is processing for modifying a physical property corresponding to the physical property information, on the one or at least two processed images; and
an output unit that outputs an output image, which is a processed image subjected to the physical property processing, wherein:
the image processing apparatus includes multiple output units,
the image accepting unit accepts two or more types of images obtained by capturing images of one target in different environments,
the digital processing unit performs digital processing on the accepted two or more types of images, thereby generating two or more types of processed images,
the physical property information acquiring unit acquires physical property information, which is information for specifying the whole or part of the two or more types of processed images, and
the physical property processing unit instructs the multiple output units to output the whole or part of two or more processed images in an overlapping manner, according to the physical property information.

* * * * *

UNITED STATES PATENT AND TRADEMARK OFFICE
CERTIFICATE OF CORRECTION

Page 1 of 1

PATENT NO. : 9,672,650 B2
APPLICATION NO. : 14/766118
DATED : June 6, 2017
INVENTOR(S) : Tetsujiro Kondo It is certified that error appears in the above-identified patent and that said Letters Patent is hereby corrected as shown below:

In the Specification

At Column 1, Line numbers 7-12, please amend as follows:
This application is the U.S. National Phase under 35 U.S.C. § 371 of International Patent Application No. PCT/JP2014/053021, filed on Feb. 10, 2014, which in turn claims the benefit of Japanese Application No. 2013-024993, filed on Feb. 12, 2013, the disclosures of which Applications are incorporated by reference herein.

Signed and Sealed this
Fifteenth Day of August, 2017

Joseph Matal
*Performing the Functions and Duties of the*
*Under Secretary of Commerce for Intellectual Property and*
*Director of the United States Patent and Trademark Office*